(12) United States Patent
Tortola

(10) Patent No.: US 8,439,382 B2
(45) Date of Patent: May 14, 2013

(54) BICYCLE FRAME

(76) Inventor: Lucio Tortola, Windsor (CA)

( * ) Notice: Subject to any disclaimer, the term of this patent is extended or adjusted under 35 U.S.C. 154(b) by 78 days.

(21) Appl. No.: 13/076,618

(22) Filed: Mar. 31, 2011

(65) Prior Publication Data

US 2012/0126508 A1    May 24, 2012

(51) Int. Cl.
*B62K 19/00* (2006.01)
(52) U.S. Cl.
USPC ............... 280/281.1; 280/288.3; 280/274; 280/282; 280/283
(58) Field of Classification Search .......... 280/281.1, 280/288.3, 274, 282, 283
See application file for complete search history.

(56) References Cited

U.S. PATENT DOCUMENTS

| | | |
|---|---|---|
| 447,099 A | 2/1891 | Archer et al. |
| D26,179 S | 10/1896 | Billings |
| D26,263 S | 11/1896 | Gates |
| D26,590 S | 2/1897 | Harris |
| D27,186 S | 6/1897 | Busse |
| D27,187 S | 6/1897 | Busse |
| D27,767 S | 10/1897 | Andrews |
| 609,171 A | 8/1898 | Stevens |
| D33,144 S | 8/1900 | Smithers |
| 2,151,533 A | 3/1939 | Schwinn |
| 2,330,560 A | 9/1943 | Descos |
| 3,226,132 A | 12/1965 | Otani |
| D208,044 S | 7/1967 | Voytech |
| D211,225 S | 5/1968 | Voytech |
| 3,794,351 A | 2/1974 | Cudmore |
| D239,009 S | 3/1976 | Yokahama et al. |
| 4,015,854 A | 4/1977 | Raymond |
| 4,453,730 A | 6/1984 | Klose |
| D343,598 S | 1/1994 | Southwell et al. |
| D478,299 S | 8/2003 | Hartman |

(Continued)

FOREIGN PATENT DOCUMENTS

| WO | 2004/005122 A1 | 1/2004 |
|---|---|---|
| WO | 2004/074082 A1 | 9/2004 |

OTHER PUBLICATIONS

PCT International Application No. PCT/CA2011/001274 Search Report dated Feb. 8, 2012.

(Continued)

*Primary Examiner* — Tashiana Adams
*Assistant Examiner* — Marlon Arce
(74) *Attorney, Agent, or Firm* — Perry + Currier

(57) ABSTRACT

A bicycle frame is provided comprising: two substantially concentric rings connected along a front portion and flared out at a rear portion to enable a rear bicycle wheel to fit there between, the two substantially concentric rings enabled to absorb strain energy received from at least one of the rear wheel and weight from a rider; a seat post for receiving a bicycle seat, the seat post extending from a top portion of the two substantially concentric rings; a rear wheel bracket extending from a bottom rear portion of each of the two substantially concentric rings for supporting the rear wheel between the two substantially concentric rings; a bottom bracket located proximal a bottom front portion of the two substantially concentric rings, the bottom bracket for connecting at least a crank to the bicycle frame; a headtube for receiving a front fork; and, at least one support for the headtube to connect the headtube to the two substantially concentric rings.

10 Claims, 39 Drawing Sheets

U.S. PATENT DOCUMENTS

| | | |
|---|---|---|
| D542,717 S | 5/2007 | Stumm et al. |
| 7,377,534 B2 | 5/2008 | Ellsworth |
| D612,300 S | 3/2010 | Lobnitz |
| D626,037 S | 10/2010 | Thetard |
| 2006/0138743 A1* | 6/2006 | Beal ............................. 280/275 |
| 2007/0145710 A1 | 6/2007 | Stumm et al. |

OTHER PUBLICATIONS

PCT International Application No. PCT/CA2011/001274 Written Opinion dated Feb. 8, 2012.

* cited by examiner

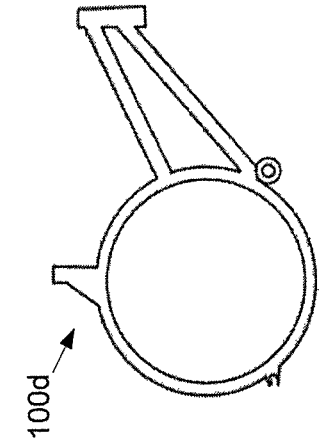
Fig. 8c
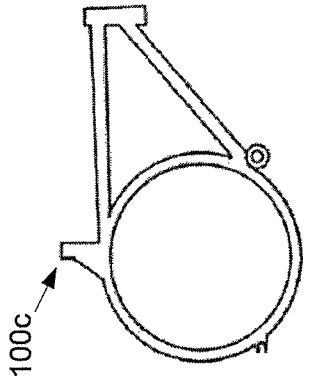
Fig. 8b
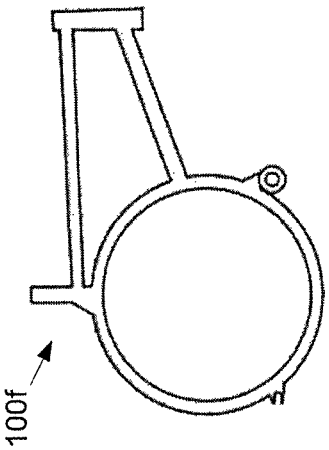
Fig. 8e
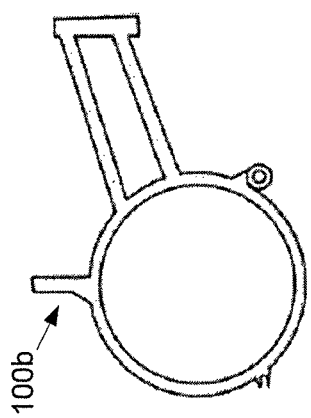
Fig. 8a
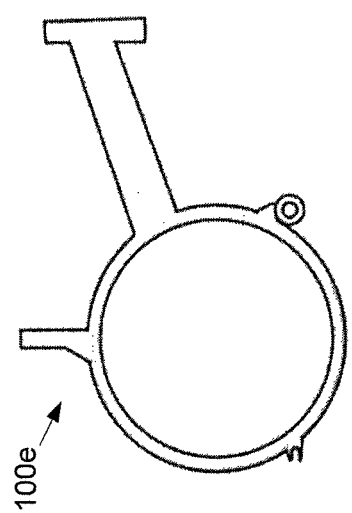
Fig. 8d
Fig. 8

Summary of Bicycle frame FEA results

| | Displacements (inches) | | |
|---|---|---|---|
| | max at seat | total pedal displacement | fore/aft at pedals |
| Frame of D27187 | 0.058 0.036 | 0.040 | 0.016 |
| Frame of D27186 | 0.027 0.027 | 0.014 | 0.0067 |
| Frame of D26590 | 0.049 0.045 | 0.035 | 0.0029 |
| Frame of D26590-Variant | 0.050 0.046 | 0.034 | 0.0029 |
| Diamond Frame | 0.0025 0.0025 | 0.0019 | 0.0003 |
| Frame 100 | 0.026 0.026 | 0.0065 | 0.0051 |
| Frame 100a | 0.026 0.026 | 0.0065 | 0.0051 |

TABLE 1

| | Principle Stress (ksi) and Strain (uI) | | | Total Stored Strain Energy (approx.) | |
|---|---|---|---|---|---|
| | 1st princ stress | 1st princ strain | Ref. minimum Safety Factor | * Approximate Averaged stress over entire frame | Strain Energy (in-lbs) |
| Frame of D27187 | 24.4 | 1.02E-03 | 1.06 | 24.4 ÷ 2 × 15% = 1.83 | 3.07 |
| Frame of D27186 | 14.7 | 55.7E-03 | 1.71 | 14.7 ÷ 2 × 70% = 5.88 | 31.5 |
| Frame of D26590 | 13.7 | 40.6E-03 | 2.56 | 13.6 ÷ 2 × 50% = 3.40 | 10.5 |
| Frame of D26590-Variant | 29.0 | 1.04E-03 | 1.12 | 29.0 ÷ 2 × 15% = 2.18 | 4.35 |
| Diamond Frame | 11.1 | 29.1E-03 | 4.3 | 11.1 ÷ 2 × 20% = 1.11 | 1.14 |
| Frame 100 | 21.4 | 73.3E-03 | 1.24 | 21.4 ÷ 2 × 80% = 8.56 | 67.0 |
| Frame 100a | 20.3 | 70.2E-03 | 1.17 | 20.2 ÷ 2 × 80% = 8.08 | 59.6 |

TABLE 2

Fig. 39

BICYCLE FRAME

CROSS-REFERENCE TO RELATED APPLICATIONS

The present application claims priority from WIPO International Design Registration No. DM/075018, filed Nov. 21, 2010.

FIELD

The specification relates generally to bicycle frames, and specifically to a bicycle frame comprising two substantially concentric rings.

BACKGROUND

Shock absorption in a standard diamond frame bicycle is distributed, via a seat tube and seat stays, directly up into the bicycle seat and thus to a rider of the bicycle. While such shock can be mitigated by various shock absorbers incorporated into the frame, such shock absorbers can be costly and can add substantial weight to the frame.

BRIEF DESCRIPTIONS OF THE DRAWINGS

For a better understanding of the various implementations described herein and to show more clearly how they may be carried into effect, reference will now be made, by way of example only, to the accompanying drawings in which.

Figure 1:
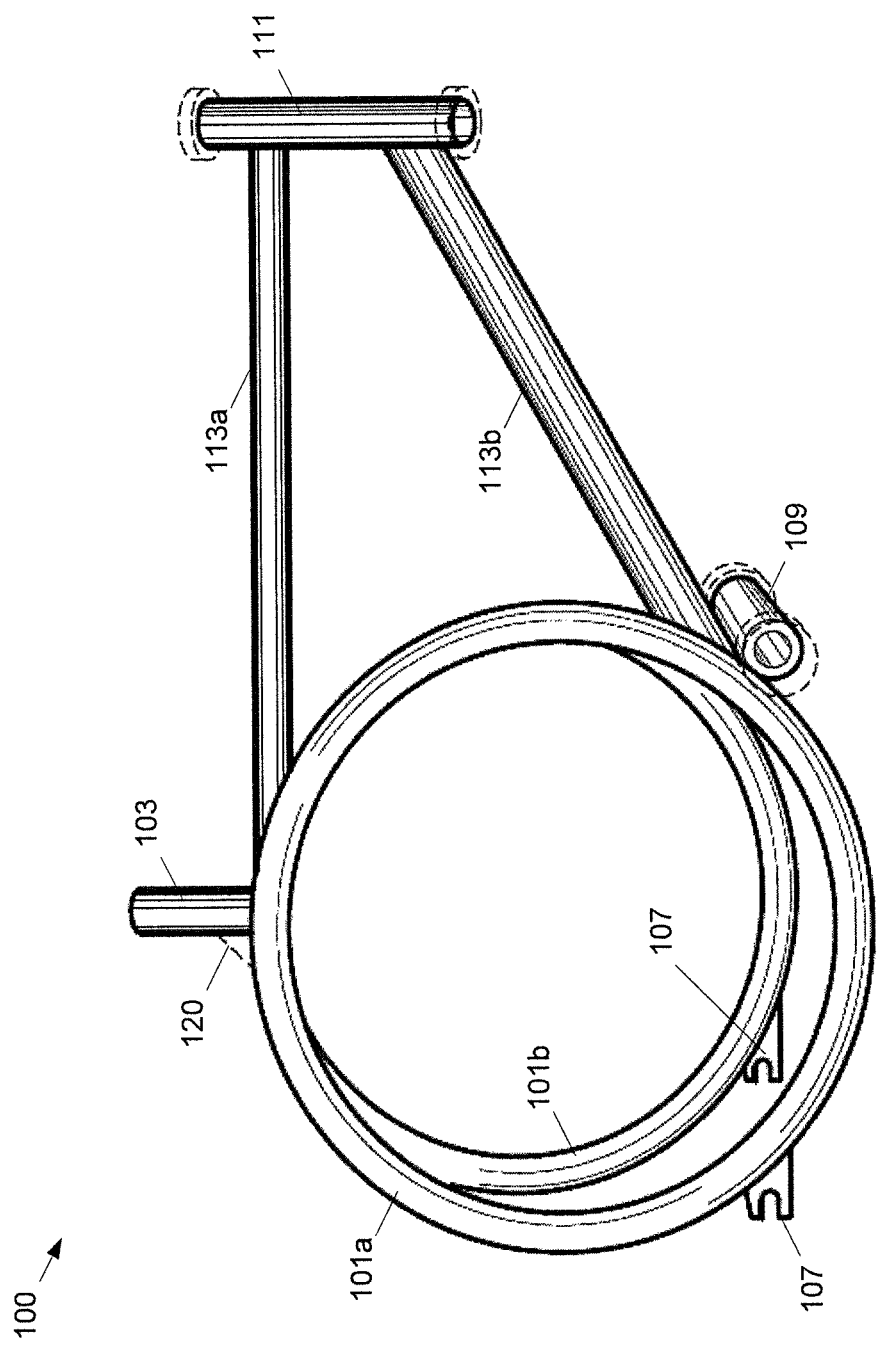
FIG. 1 is a right side perspective view of a bicycle frame, according to non-limiting implementations, the left side being a mirror image of the right side view.
Figure 7C:
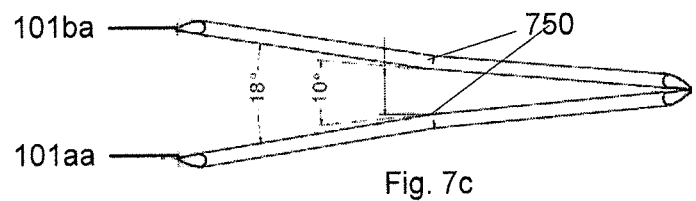
Figure 7B:
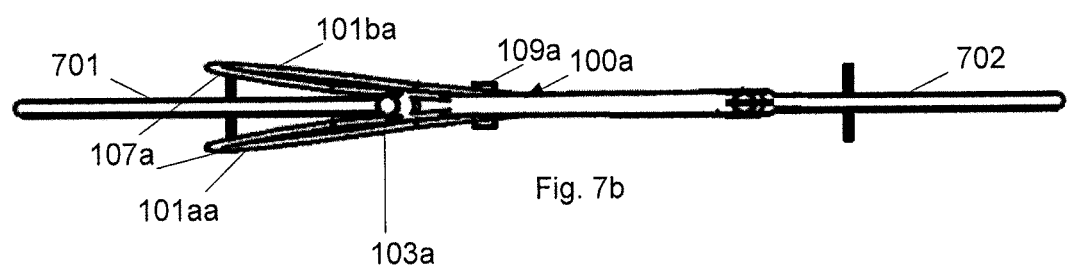
Figure 7A:
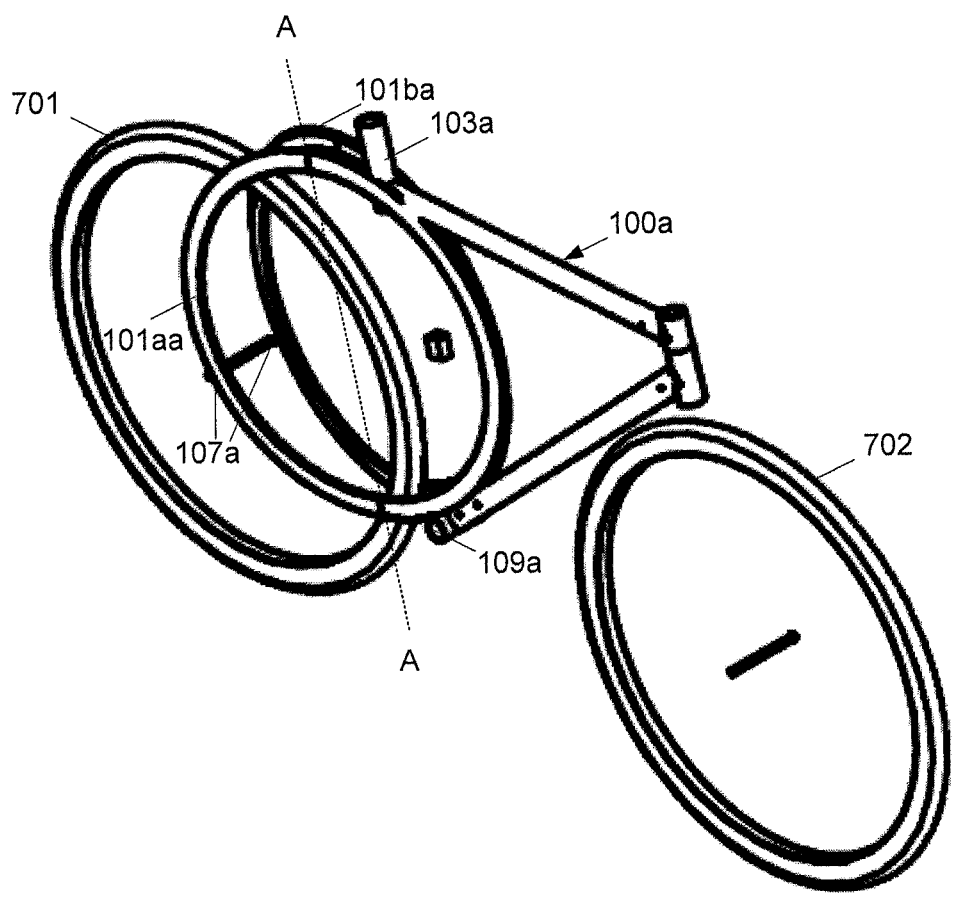

FIGS. 7a, and 7b depict a variant of the bicycle frame of FIG. 1, according to non-limiting implementations.

FIG. 7c depicts a profile of rings of the bicycle frame of FIGS. 7a and 7b, according to non-limiting implementations.

FIGS. 8a to 8e depict variants of the bicycle frame of FIG. 1, according to non-limiting implementations.

Figure 9:
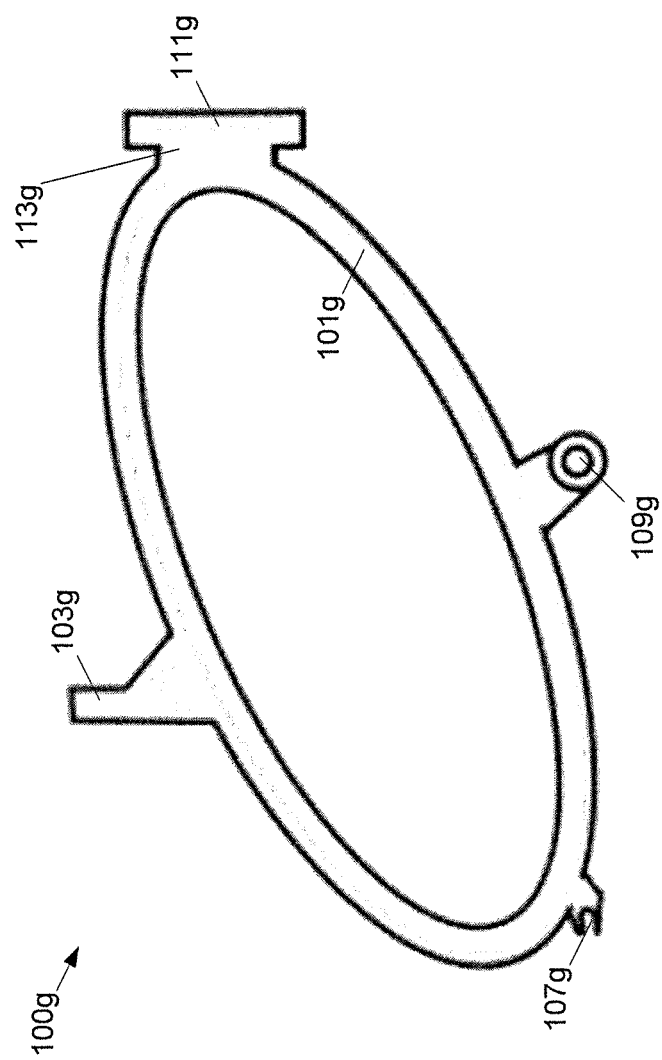
Figure 10:
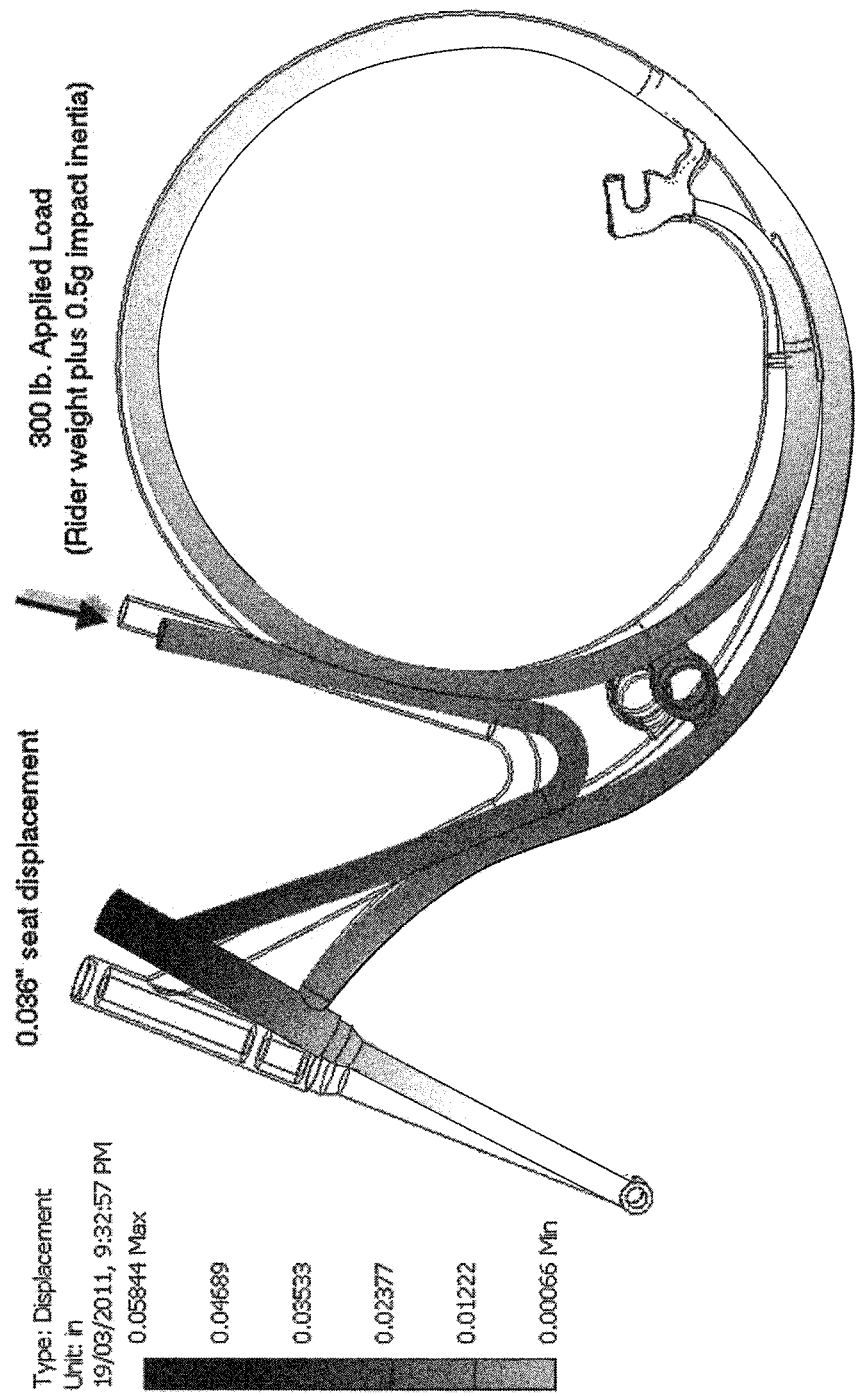
Figure 11:
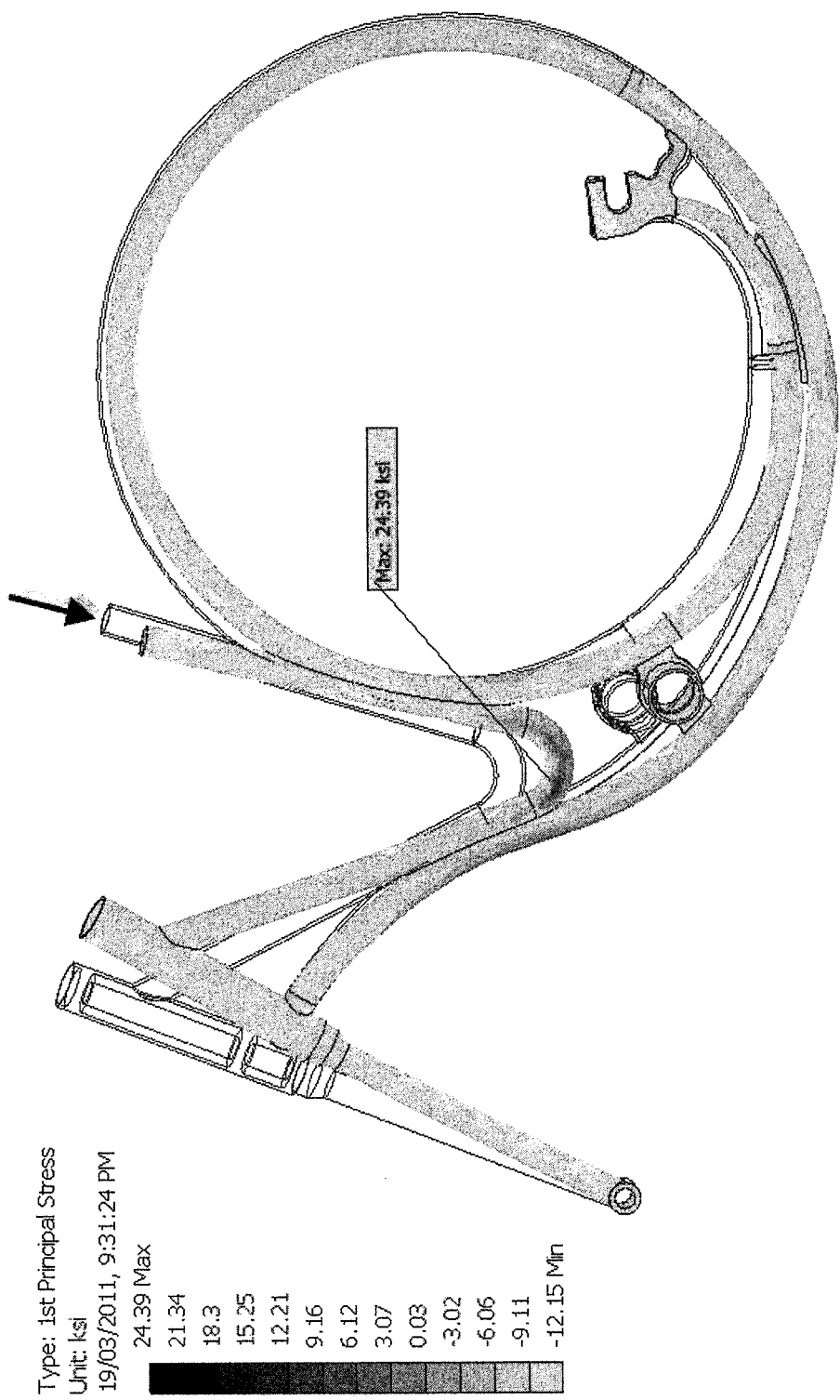

FIG. 9 depicts a variant of the bicycle frame of FIG. 1, according to non-limiting implementations.

FIGS. 10-13 depict Finite Element Analysis (FEA) testing of a model of a bicycle frame disclosed in U.S. Design patent 27187 issued on Jun. 8, 1897 to Busse.

FIGS. 14-17 depict Finite Element Analysis (FEA) testing of a bicycle frame disclosed in U.S. Design patent 27186 issued on Jun. 8, 1897 to Busse.

FIGS. 18-21 depict Finite Element Analysis (FEA) testing of a model of a bicycle frame disclosed in U.S. Design patent 26590 issued on Feb. 2, 1897 to Harris.

FIGS. 22-25 depict Finite Element Analysis (FEA) testing of a model of a variant of a bicycle frame disclosed in U.S. Design patent 26590 issued on Feb. 2, 1897 to Harris.

FIGS. 26-29 depict Finite Element Analysis (FEA) testing of a model of a diamond bicycle frame.

FIGS. 30-34 depict Finite Element Analysis (FEA) testing of a model the bicycle frame of FIGS. 7a-7c.

FIGS. 35-38 depict Finite Element Analysis (FEA) testing of a model the bicycle frame of FIGS. 1-6.

FIG. 39 summarizes the results of the FEA testing of FIGS. 10-38.

DETAILED DESCRIPTION

An aspect of the specification provides a bicycle frame comprising: two substantially concentric rings connected along a front portion and flared out at a rear portion to enable a rear bicycle wheel to fit there between, the two substantially concentric rings enabled to absorb strain energy received from at least one of the rear wheel and weight from a rider; a seat post for receiving a bicycle seat, the seat post extending from a top portion of the two substantially concentric rings; a rear wheel bracket extending from a bottom rear portion of each of the two substantially concentric rings for supporting the rear wheel between the two substantially concentric rings; a bottom bracket located proximal a bottom front portion of the two substantially concentric rings, the bottom bracket for connecting at least a crank to the bicycle frame; a headtube for receiving a front fork; and, at least one support for the headtube to connect the headtube to the two substantially concentric rings.

Each of the two substantially concentric rings can comprise at least one of a circle and an annulus.

The at least one support structure can comprise at least one of: a top tube extending from the headtube to the top portion of the two substantially concentric rings or a top front portion of the two substantially concentric rings; a second tube extending from the headtube to the top front portion of the two substantially concentric rings; a third tube extending from the headtube to the seat post; a down tube extending from the headtube to the bottom front portion of the two substantially concentric rings, proximal the bottom bracket.

Each of the two substantially concentric rings can comprise an ellipse. The ellipse can extends from the rear wheel brackets to the headtube, and the at least one support structure can comprise at least a weld to the ellipse.

The two substantially concentric rings can be further flared out at the rear portion via a bend in the two substantially concentric rings providing further space for the rear wheel to fit there between.

The seat post can extend from a gap between the two substantially concentric rings, and the seat post can be connected to each of the two substantially concentric rings in the gap. The at least one support for the headtube can comprise: a top tube extending from the gap to the headtube, the top tube connected to at least one of the seat post and each of the two substantially concentric rings in the gap; and a down tube extending from the headtube to the bottom front portion of the two substantially concentric rings, proximal the bottom bracket. The downtube can be connected to at least one of the bottom front portion and the bottom bracket.

The two substantially concentric rings, the seat post, the rear wheel bracket, the bottom bracket, the headtube and the at least one support for the headtube can comprise an integral structure.

The two substantially concentric rings are monolithically independent of the seat post, the rear wheel bracket, the bottom bracket, the headtube and the at least one support for the headtube, such that the strain energy is substantially absorbed by the two substantially concentric rings thereby preventing the strain energy from being substantially translated to a remaining portion of the bicycle frame.

The bicycle frame can further comprise at least one of metal, metal alloys, aluminum, aluminum alloys, steel, high carbon steel, chromyl steel, titanium, carbon fibre, and bamboo.

FIGS. 1 to 6 depict a bicycle frame 100, according to non-limiting implementations. Bicycle frame 100 will hereafter be interchangeably referred to as frame 100. In any event, frame 100 comprises two substantially concentric rings 101a, 101b referred to hereafter in the plural as rings 101 and generically as a ring 101. Rings 101 are connected and/or joined along a front portion and flare out at a rear portion to enable a rear bicycle wheel to fit there between: for example rings 101 are generally understood to form a "V"-shape, and diverge outwardly from the front join, and towards the rear. In some implementations, rings 101 can also curve outward from the join. In yet further implementations, each ring 101 can comprise one or more bends to increase the flare. Furthermore, it is appreciated that the flare of rings 101 is symmetric along the length of frame 100 (e.g. symmetric about a longitudinal axis). Each ring 101 can be formed separately and joined together using any suitable method, including but not limited to welding and brazing. Further, due to the ring shape (which can range from circular to elliptical as described below), rings 101 are appreciated to distribute and dissipate shock and/or strain energy received via at least one of the rear wheel and weight from a rider, as will be explained in further detail below.

In general, however, it is appreciated that rings 101 are provided in place of a seat tube, seat stays and chain stays in a standard diamond frame. Indeed, it is further appreciated that rings 101 provide a similar function to seat tube, seat stays and chain stays in a standard diamond frame but are better suited at distributing both weight from a rider, shock from a rear wheel, and/or dissipating strain energy.

It is furthermore appreciated that in implementations depicted in FIGS. 1 to 6 that rings 101 comprise circle and/or an annulus. However, deviations from a perfect circle are within the scope of present implementations and as will be described below, in some implementations rings 101 can be in the form of an ellipse (for example, see FIG. 9), or any other closed ring structure that absorbs and/or distributes shock received via at least one of the rear wheel and weight from a rider.

Frame 100 further comprises a seat post 103 for receiving a bicycle seat, seat post 103 extending from a top portion of rings 101.

Frame 100 further comprises a rear wheel bracket 107 extending from a bottom rear portion of each of two substantially concentric rings 101 for supporting the rear wheel between rings 101. While bracket 107 extends outwardly and towards the rear of frame 100, in other implementations bracket 107 can extend inwardly.

Frame 100 further comprises a bottom bracket 109 located proximal a bottom front portion of rings 101, bottom bracket 109 for connecting at least a crank, pedals etc. to frame 100. While bracket 109 is located external to rings 101, in other implementations bracket 109 can be located internal to rings 101.

Frame 100 further comprises a headtube 111 for receiving a front fork, which in turn can accept a front wheel there between.

Frame 100 further comprises at least one support 113a, 113b for headtube 111, at least one support 113a, 113b for connecting headtube 111 to rings 101. In depicted implementations of FIGS. 1 to 6, support 113a comprises a top tube extending from headtube 111 to rings 101 proximal seat tube 103. Support 113b comprises a down tube extending from headtube 111 to a bottom front portion of 101, proximal bottom bracket 109. It is appreciated that some implementations, support 113b is connected to at least one of bottom front portion and bottom bracket 109.

Figure 2:
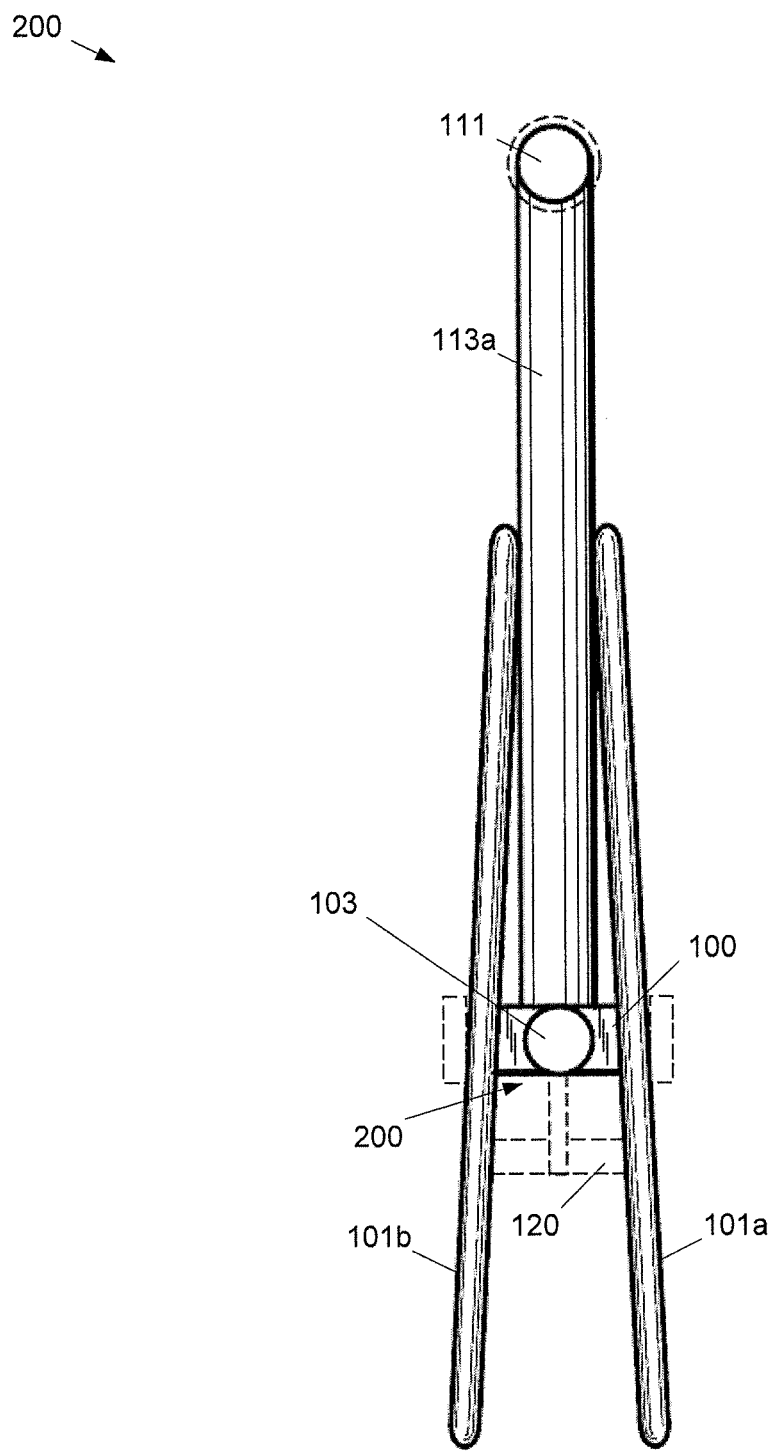
FIG. 2 is a top view of the bicycle frame of FIG. 1, according to non-limiting implementations.
Figure 3:
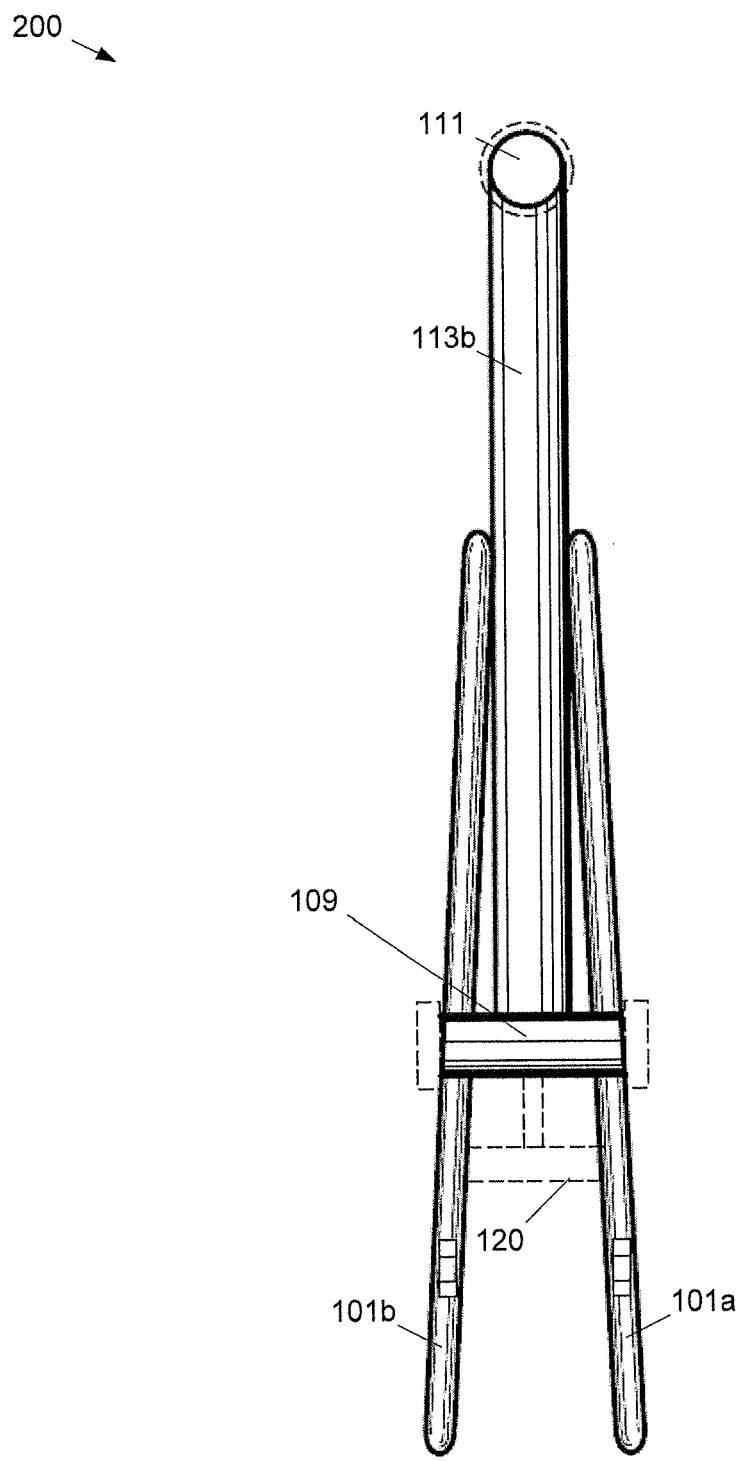
FIG. 3 is a bottom view of the bicycle frame of FIG. 1, according to non-limiting implementations.
Figure 4:
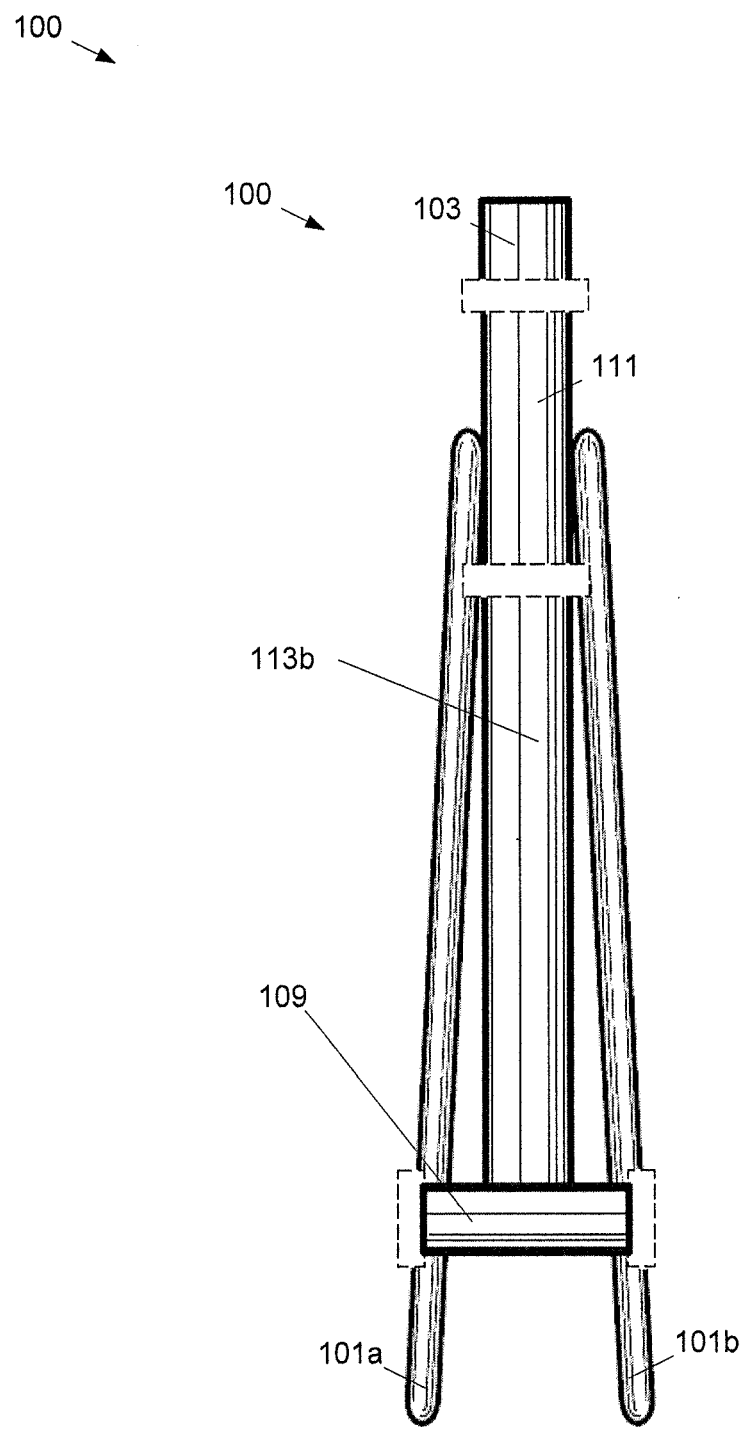
FIG. 4 is a front view of the bicycle frame of FIG. 1, according to non-limiting implementations.
Figure 5:
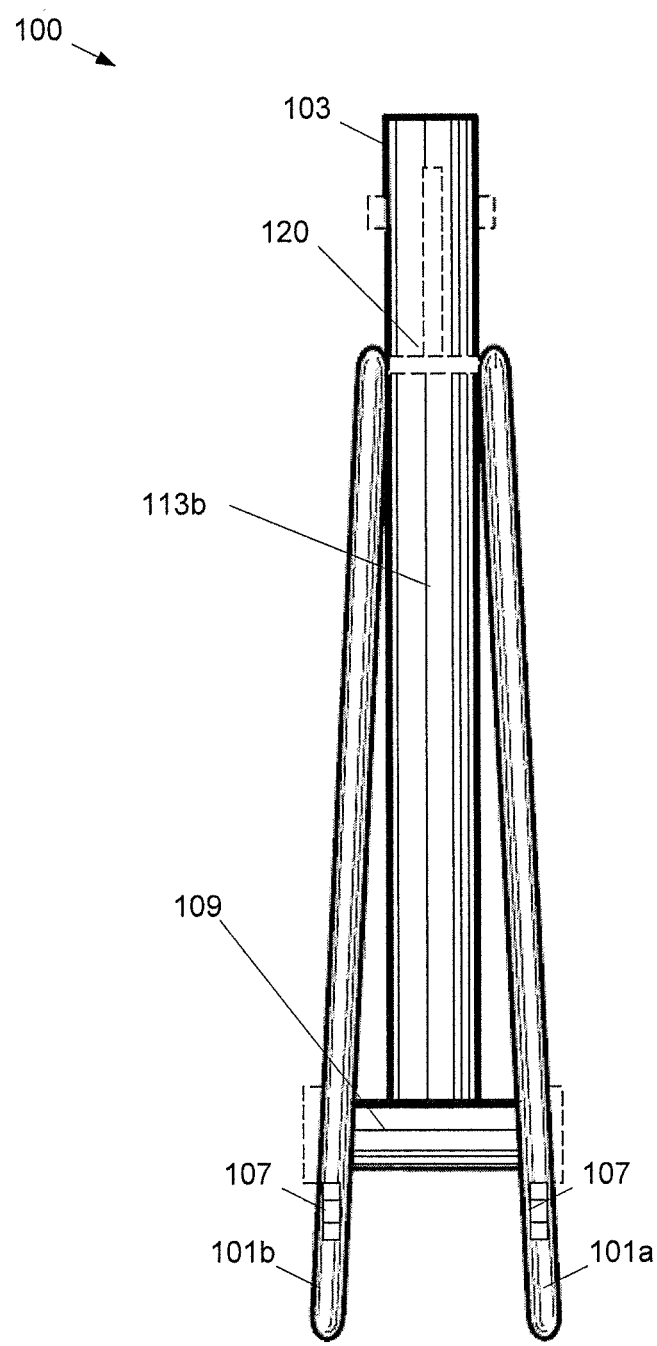
FIG. 5 is a rear view of the bicycle frame of FIG. 1, according to non-limiting implementations.

Furthermore, as can best be seen in FIG. 2, support 113a can be connected to at least one of seat post 103 and each of rings 101 in a gap 201 between rings 101 in the top portion. Indeed, in these implementations, seat post 103 can extend from gap 103 and further rings 101 can be joined in gap 103 via a connecting support 201.

It is yet further appreciated that rings 101, seat post 103, rear wheel brackets 107, bottom bracket 109, headtube 111 and at least one support 113a, 113b for headtube 111 can comprise an integral structure, for example all the elements welded, brazed and/or connected together in a generally integral structure. It is yet further appreciated that frame 100 can be constructed from any suitable combination of materials, including but not limited to metal, metal alloys, aluminum, aluminum alloys, steel, high carbon steel, chromoly steel, titanium, carbon fibre, bamboo, or the like.

However, it is understand that rings 101 are monolithic and while joined to other parts of frame 100, do not form a continuous structure with, for example, supports 113a, 113b. Hence, stress-energy is absorbed by rings 101 without translating stress-energy to other parts of frame 100, including but not limited to supports 113a, 113b. This is described in more detail below.

It is yet further appreciated that various alternatives and ornamentation of frame 100 is within the scope of present implementations. For example, depicted in broken lines at either end of both bottom bracket 109 and header tube 111 in FIGS. 1 to 6 are various flanges to assist in connecting other parts thereto. As can best be seen in FIGS. 1-3 and 6, an optional support structure 120 (drawn in outline) can extend rearwardly from seat post 103 to between rings 103 in gap 201 to provide further support for rings 101 and seat post 103.

It is yet further appreciated that in depicted implementations, there is no structure within rings 101. For example, there are no supports or joins within in each ring 101: in other words, each ring 101 is an open structure. However, in other implementations, each ring 101 can include at least one support, for example for translating stress from top to bottom and/or from side to side of each ring.

Figure 6:
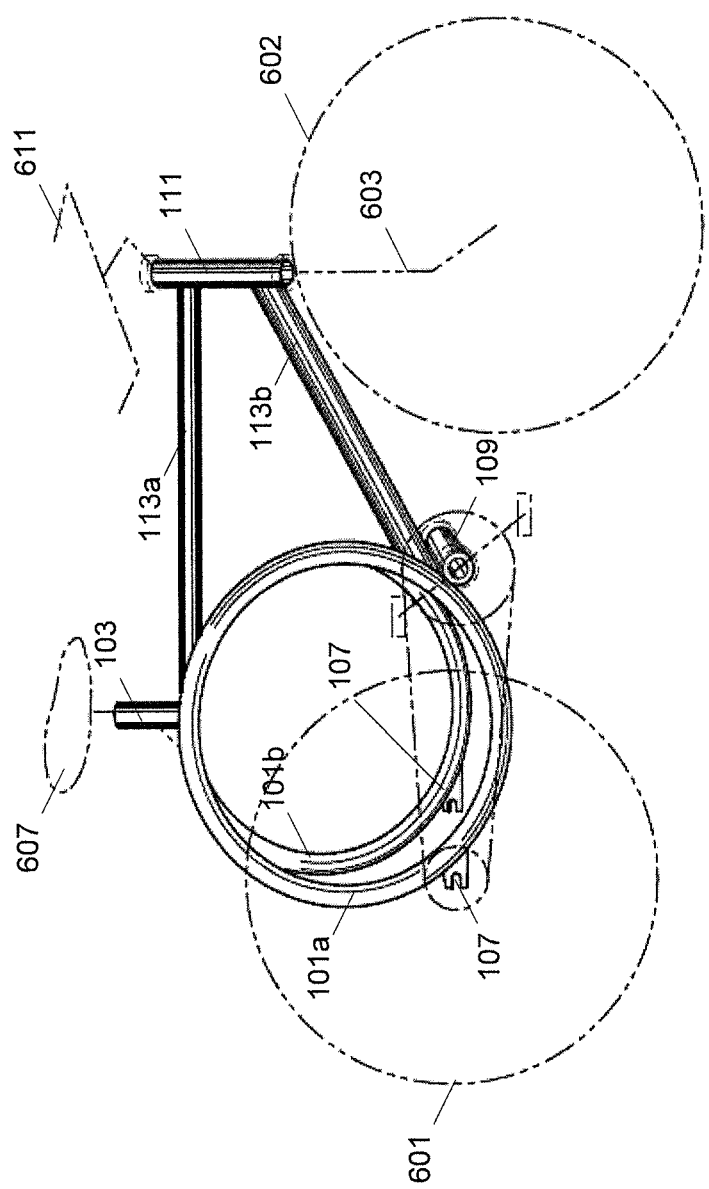
FIG. 6 is a view of the bicycle frame of FIG. 1 shown in position of use in a bicycle, with portions of a bicycle and environment shown in broken lines, according to non-limiting implementations.

Attention is now directed to FIG. 6 which depicts frame 100 shown in position of use in a bicycle, with portions of a bicycle and environment shown in broken lines. For example, rear wheel 601 is shown attached to brackets 107 and between rings 101, and front wheel 602 is shown under head post 111, attached to a fork 603 extending from a bottom of head post 111. Seat 605 is shown attached to seat post 103 and handle bars 607 are shown extending from a top of head post 111. FIG. 6 generally depicts frame 100 in operation in a bicycle, with a weight from a rider and/or shock from rear wheel 601 causing rings 101 to deform and dissipate strain.

Further variations on frame 100 are within the scope of present implementations. For example, attention is directed to FIGS. 7a, and 7b which depict perspective and top views of a frame 100a which is substantially similar to frame 100, with like elements having like numbers, but with an "a" appended thereto. It is appreciated that not all elements of frame 100a are numbered in FIGS. 7a and 7b but are nonetheless present. Furthermore, a relative position of a rear wheel 701 and a front wheel 702 are shown in FIGS. 7a and 7b.

In any event, rings 101aa, 101ba of frame 100a are similar to rings 101 but rings 101aa, 101ba are further flared out at rear portion via a bend or kink in each of rings 101 providing further space for rear wheel 701 to fit there between, as well as gears derailleurs and the like. For example, ring 101aa is bent/kinked outwards along a line AA, while ring 101ba is bent along a similar line in the opposite direction to widen the space between rings 101aa, 101ba. The bend can also be seen in profile in FIG. 7b. The bend can be formed in any suitable manner, including but not limited to welding and brazing.

To further illustrate the bend, attention is directed to FIG. 7c which depicts a further top profile of rings 101aa, 101ba. From FIG. 7c, it is appreciated that rings 101aa, 101ba are joined at a front portion and flare out at a rear portion enabling a rear will to fit there between. It is furthermore appreciated that each ring 101aa, 101ba comprises a bend 750 or kink causing each ring 101aa, 101ba to flare out further towards the rear portion.

For example, it is appreciated that bend 750 for each ring 101aa, 101ba can be out of plane about 4 degrees, though each bend can range from approximately 3° to approximately 5°. Hence, if an angle between rings 101aa, 101ba is approximately 10° near the join between rings 101aa, 101ba, then after bend 750, an angle between rings 101aa, 101ba changes to approximately 18°, as depicted in FIG. 7c. However, it is understood that any angle between rings 101aa, 101ba is within the scope of present implementations.

FIG. 7C further depicts a cross-section of each ring 101aa, 101ba. It is appreciated that each ring has a substantially aerodynamic wing shape in cross-section, with a narrow edge at an outer diameter and a wider rounded edge at an inner diameter.

Yet further variations in frame 100 are within the scope of present implementations. For example, FIGS. 8a, 8b, 8c, 8d and 8e respectively depicts frames 100b, 100c, 100d, 100e and 100f in profile. Each frame 100b, 100c, 100d, 100e and 100f comprises two substantially concentric rings connected along a front portion and flared out at a rear portion to enable a rear bicycle wheel to fit there between, the two substantially concentric rings enabled to distribute shock received via at least one of the rear wheel and weight from a rider. Each frame 100b, 100c, 100d, 100e and 100f further includes any suitable combination of a: top tube extending from a headtube to a top portion of the two substantially concentric rings or a top front portion of the two substantially concentric rings or the seat post; a second tube extending from the headtube to the top front portion of the two substantially concentric rings; and a down tube extending from the headtube to the bottom front portion of the two substantially concentric rings, proximal a bottom bracket. Indeed it is appreciated that structures connecting headtube to the two substantially concentric rings and/or the seat post are understood to be generally non-limiting.

Attention is now directed to FIG. 9, which depicts yet another frame 100g in profile. Frame 100g is similar to frame 100, with like elements having like numbers, however with a "g" appended thereto. From FIG. 9, is apparent that rings 101g are in the form of an ellipse and the ellipse extends from the rear wheel brackets 107g to headtube 111g, and the at least one support structure 113g comprises at least a weld to the ellipse. Frame 100g has the advantage of further eliminating a top tube and a down tube from the structure, as compared to frame 100.

In order to further understand the advantages of present implementations, finite element analysis (FEA) was performed on a model of frames 100 and 100a, and compared to: FEA of a model of a diamond frame; FEA of a model of a frame disclosed in U.S. Design patent 27187 issued on Jun. 8, 1897 to Busse; FEA of a frame disclosed in U.S. Design patent 27186 issued on Jun. 8, 1897 to Busse; and FEA of two variations of a model of a frame disclosed in U.S. Design patent 26590 issued on Feb. 2, 1897 to Harris. In general, in the FEA analysis, a 300 lb. seat load that was applied, displacement of each frame was determined, as well as $1^{st}$ principal stress in each frame (in kips per square inch (KSI)), $1^{st}$ principal strain in each frame (a unitless metric as indicated by "ul") and a safety factor (ultimate stress/applied stress also unitless ("ul")) for all the frames under analysis: hence four test results are respectively provided for each frame, as described hereafter and summarized in FIG. 39. Furthermore, each frame was assumed to be made from steel and further assumed to be 15 lbs and 53 cubic inches.

Busse "Girls" Frame of D27187

Attention is first directed to FIGS. 10 to 13 which depict results of FEA modelling of stress testing on the frame disclosed in U.S. Design patent 27187 issued on Jun. 8, 1897 to Busse.

The reaction of the Busse girls frame under 300 lb. seat load was to bend at the narrowed section/weak point, of the frame causing the fore and aft sections of the bike frame to rotate inward from the top, more drastically than any of the other bike frames analyzed in the FEA comparison. The vertical displacement of pedal hub relative to the rear axle fixed pivot point was 0.016" which is the highest value for this displacement experienced by any of the other bike frames analyzed in the FEA comparison. Much of the lower portion of the frame, and area around the narrowed section of frame, displayed values in a low range of a safety factor scale.

Figure 12:
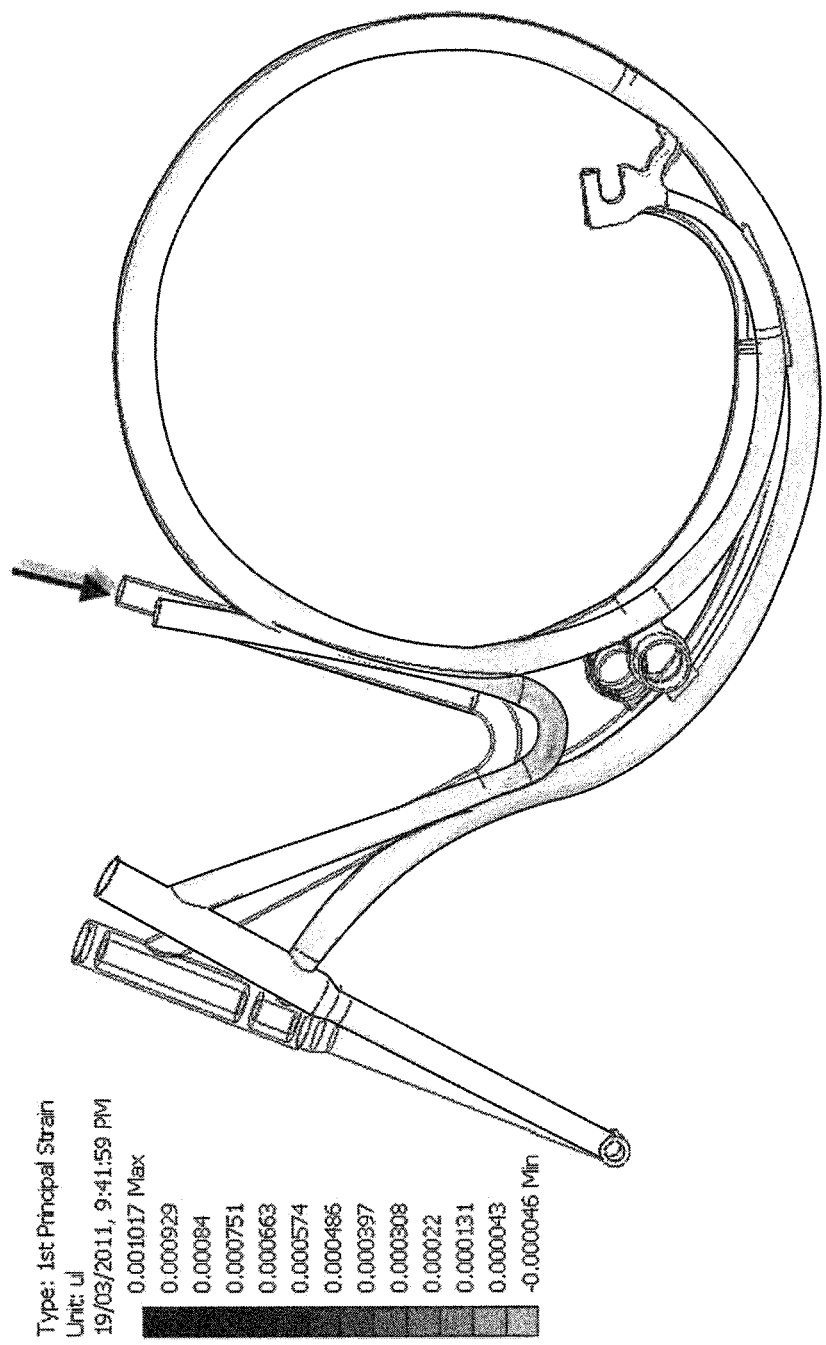
Figure 13:
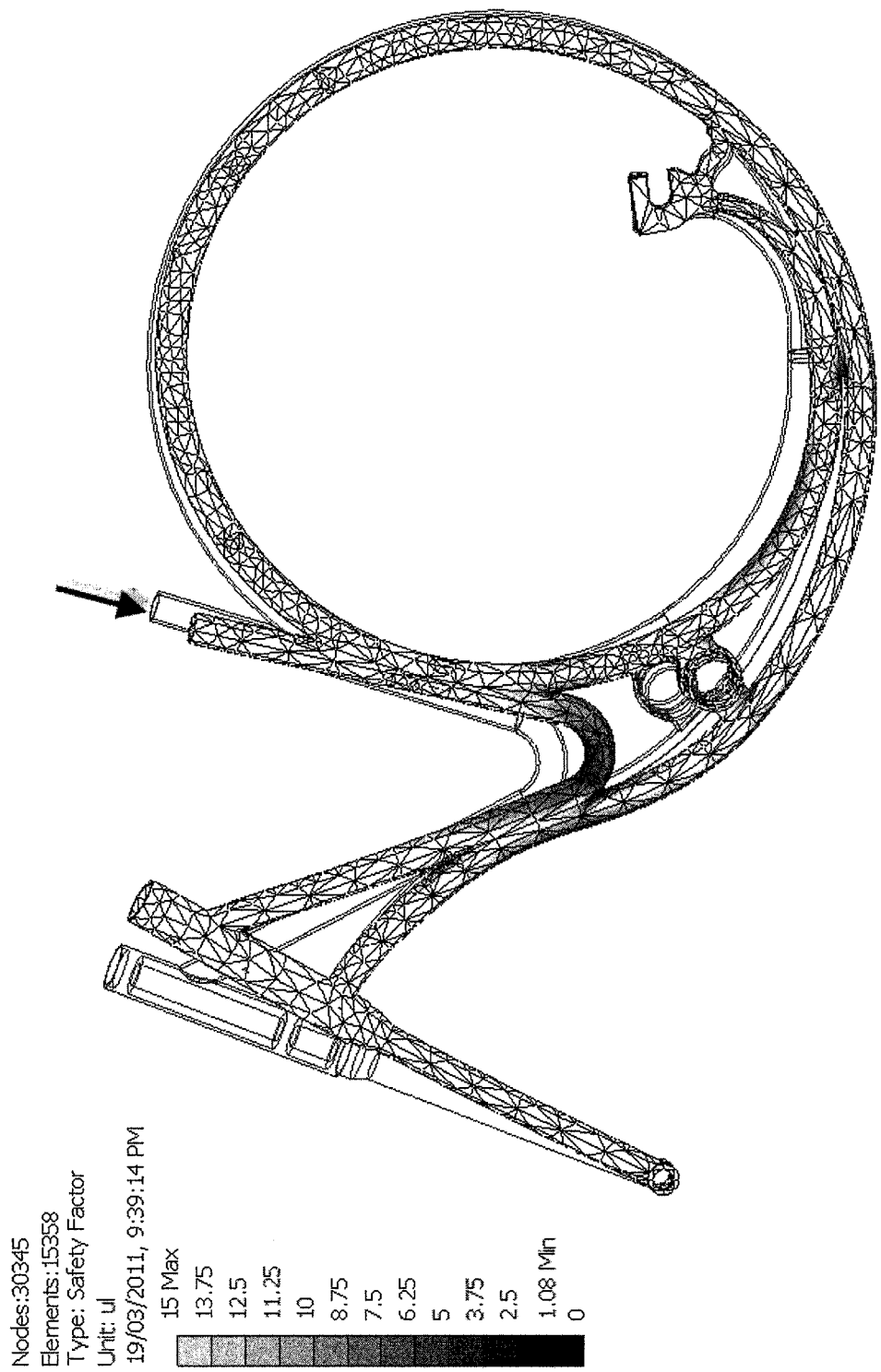
Figure 14:
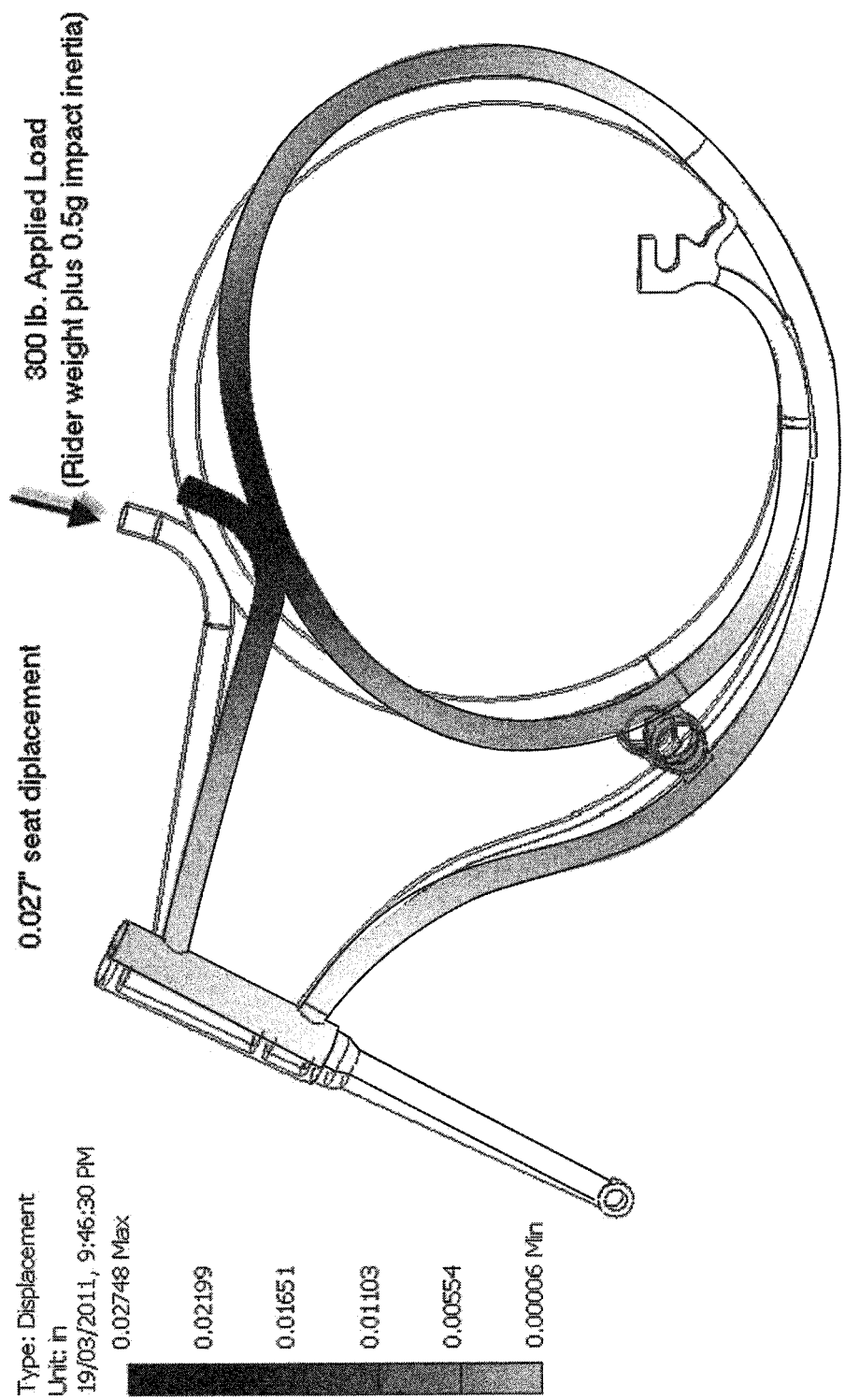
Figure 15:
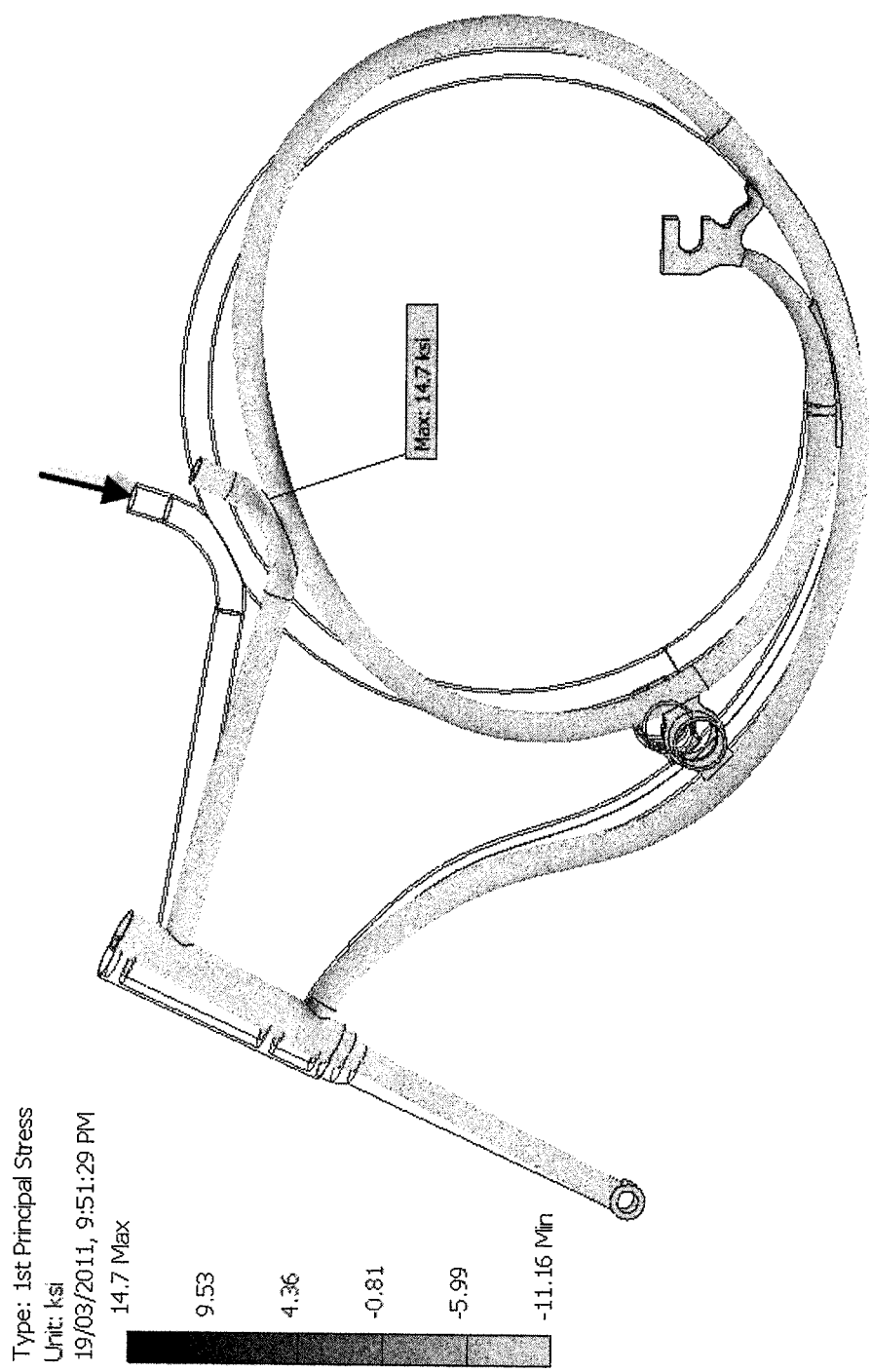
Figure 16:
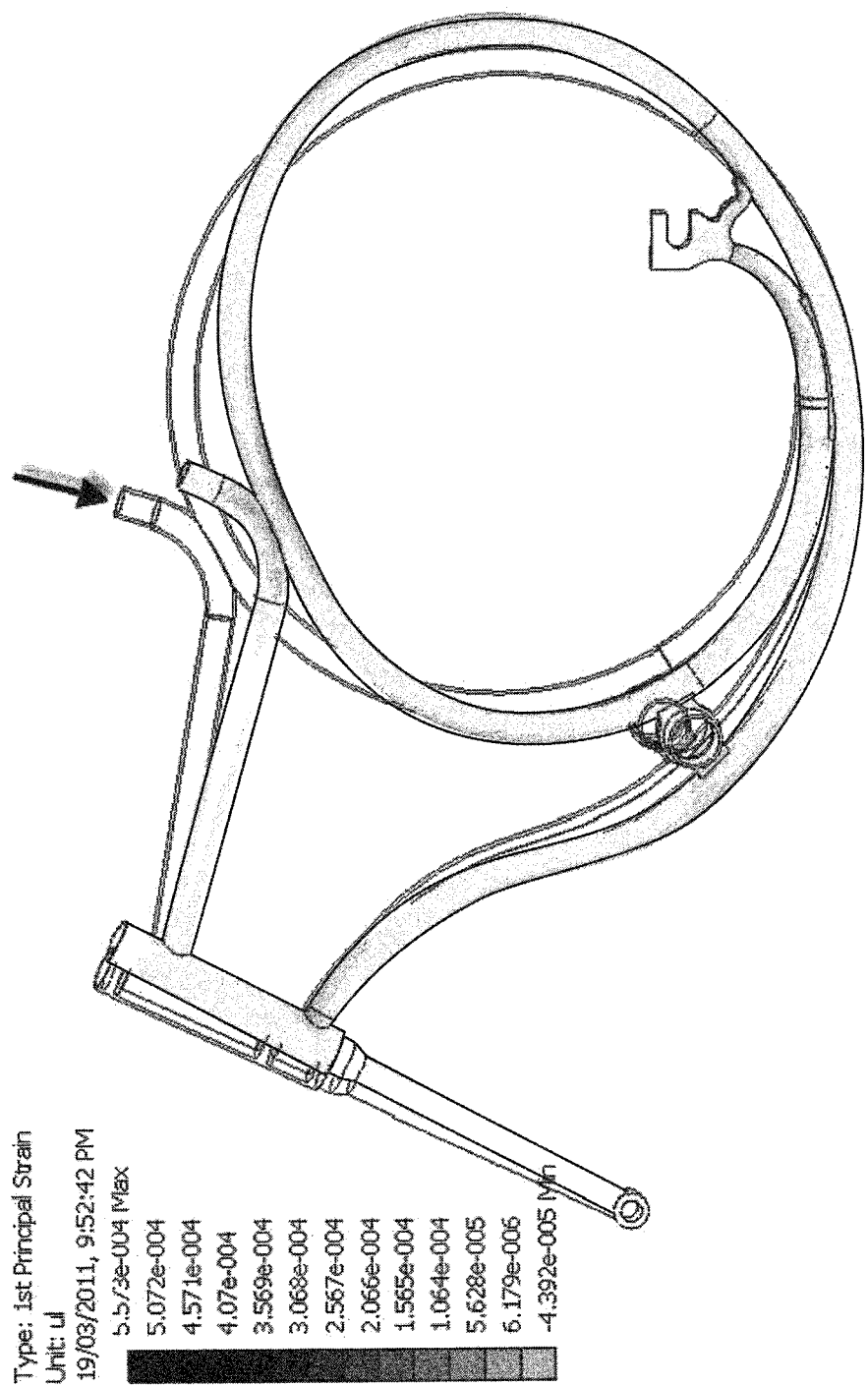
Figure 17:
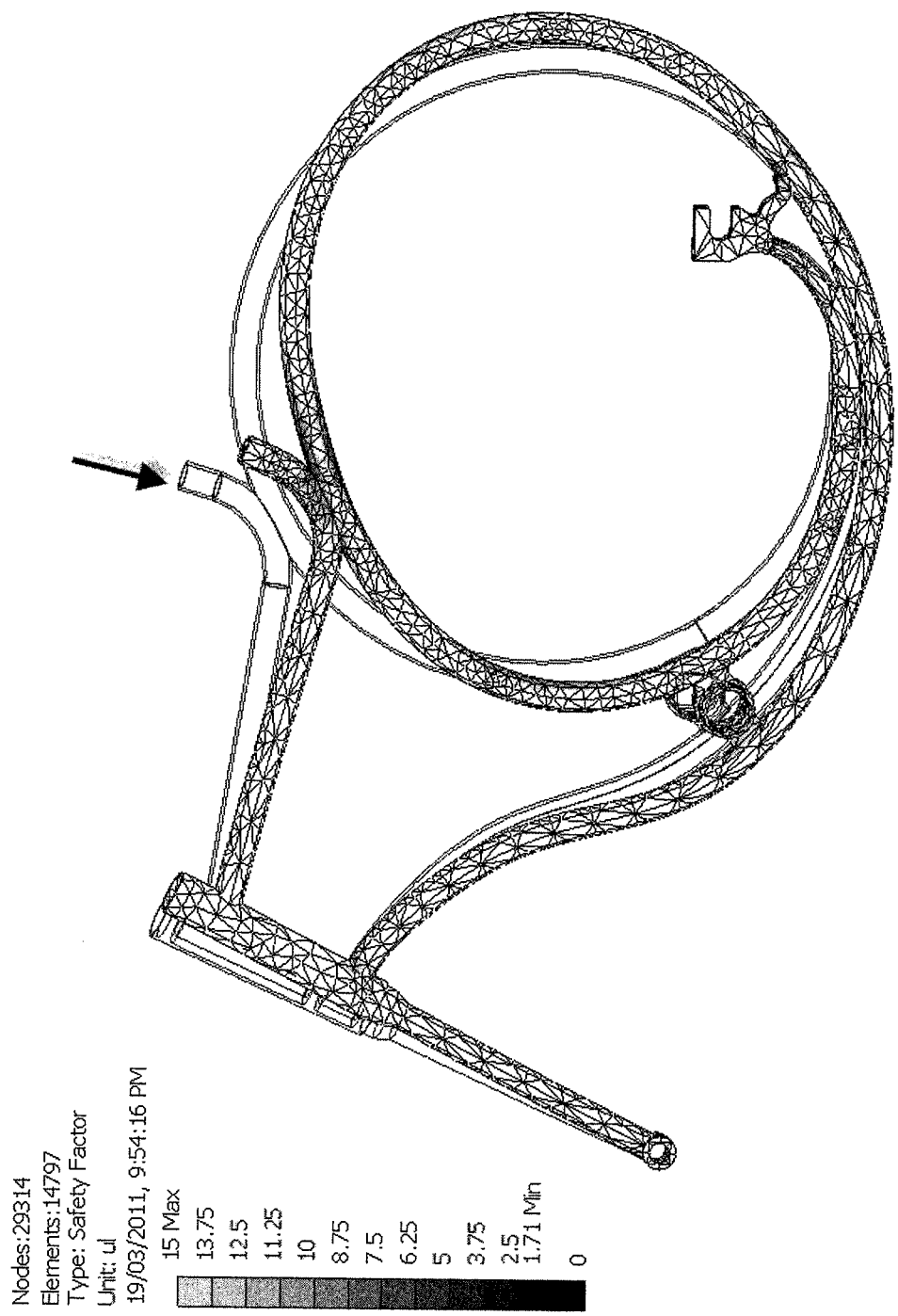
Figure 18:
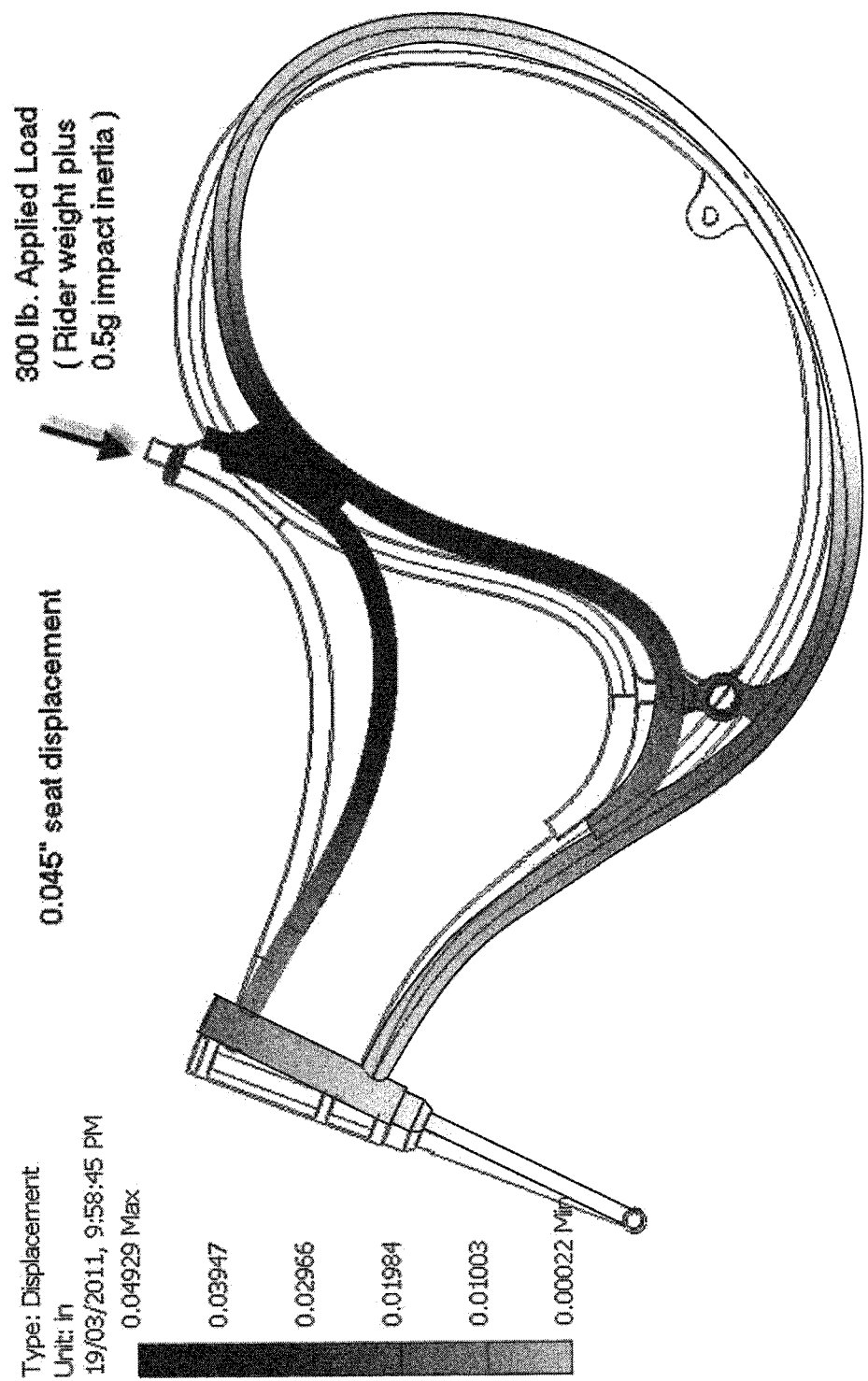
Figure 19:
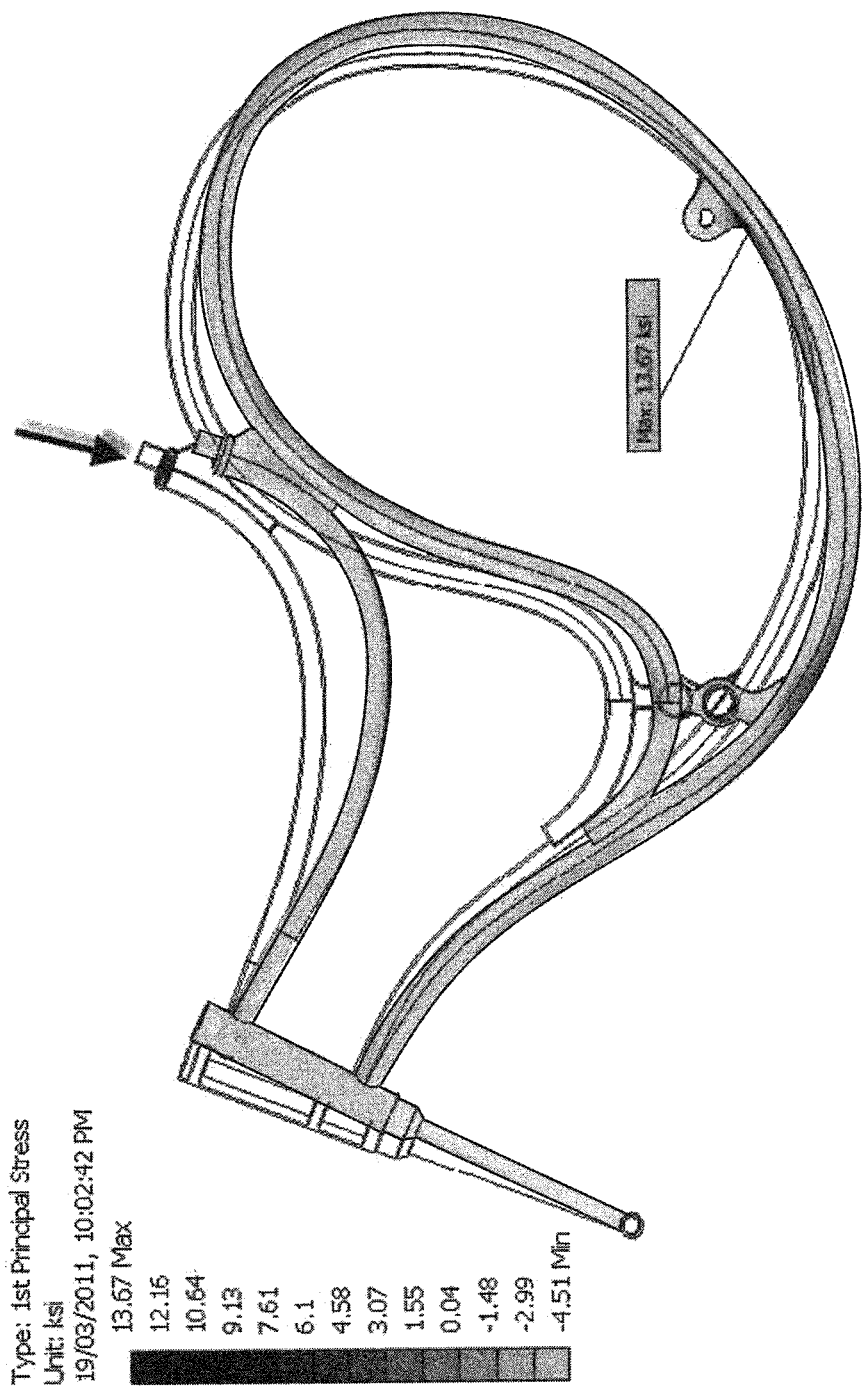
Figure 20:
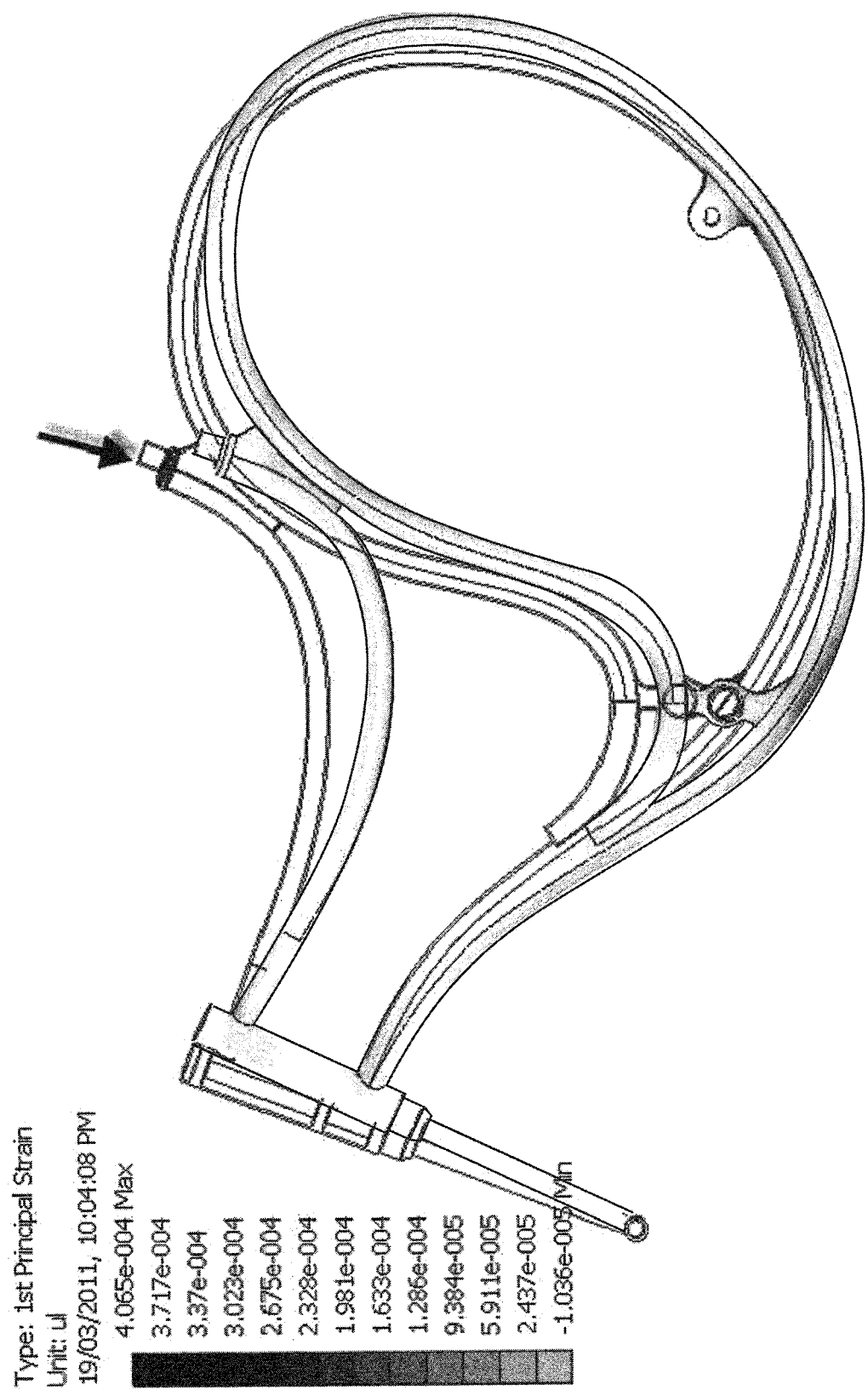
Figure 21:
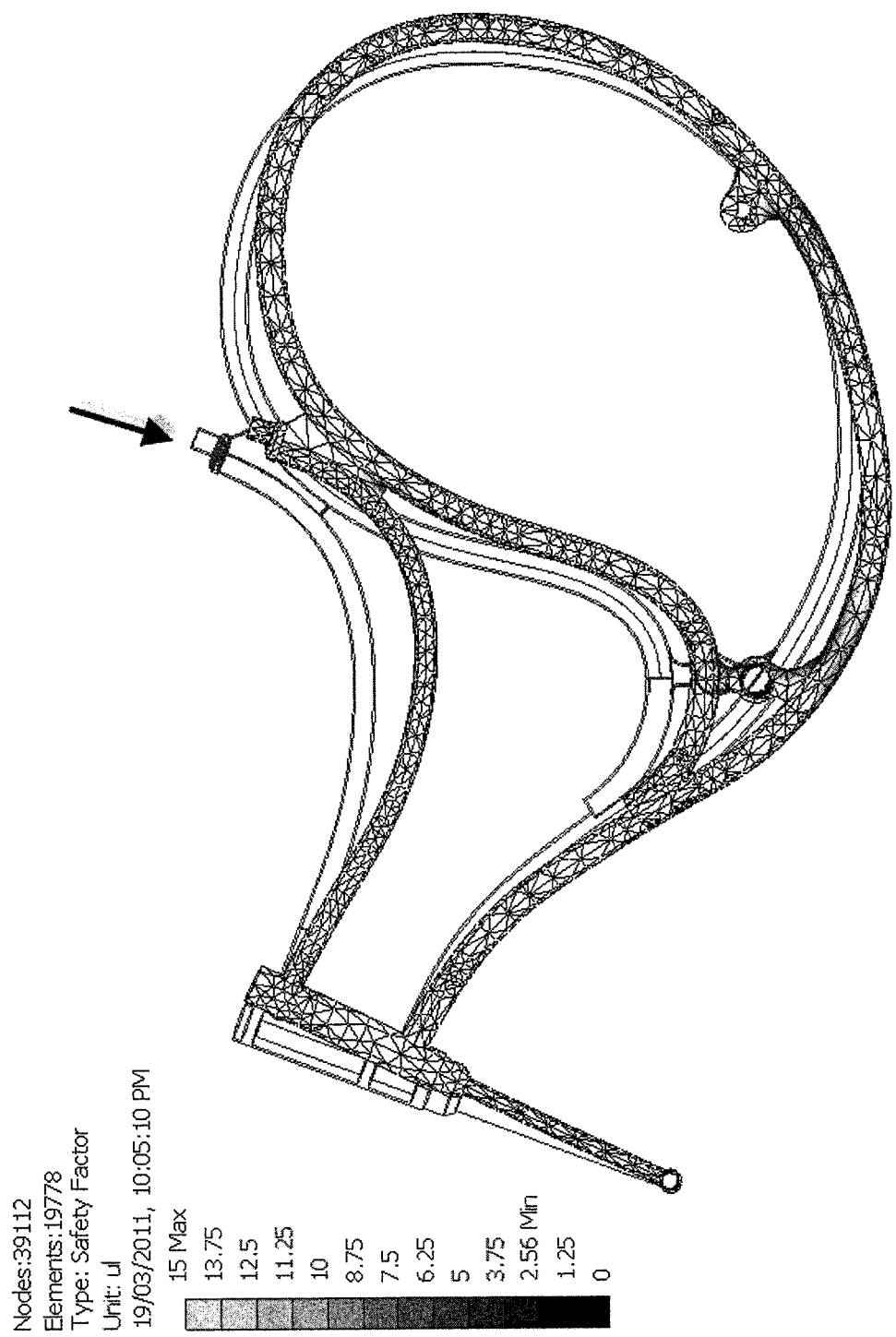
Figure 22:
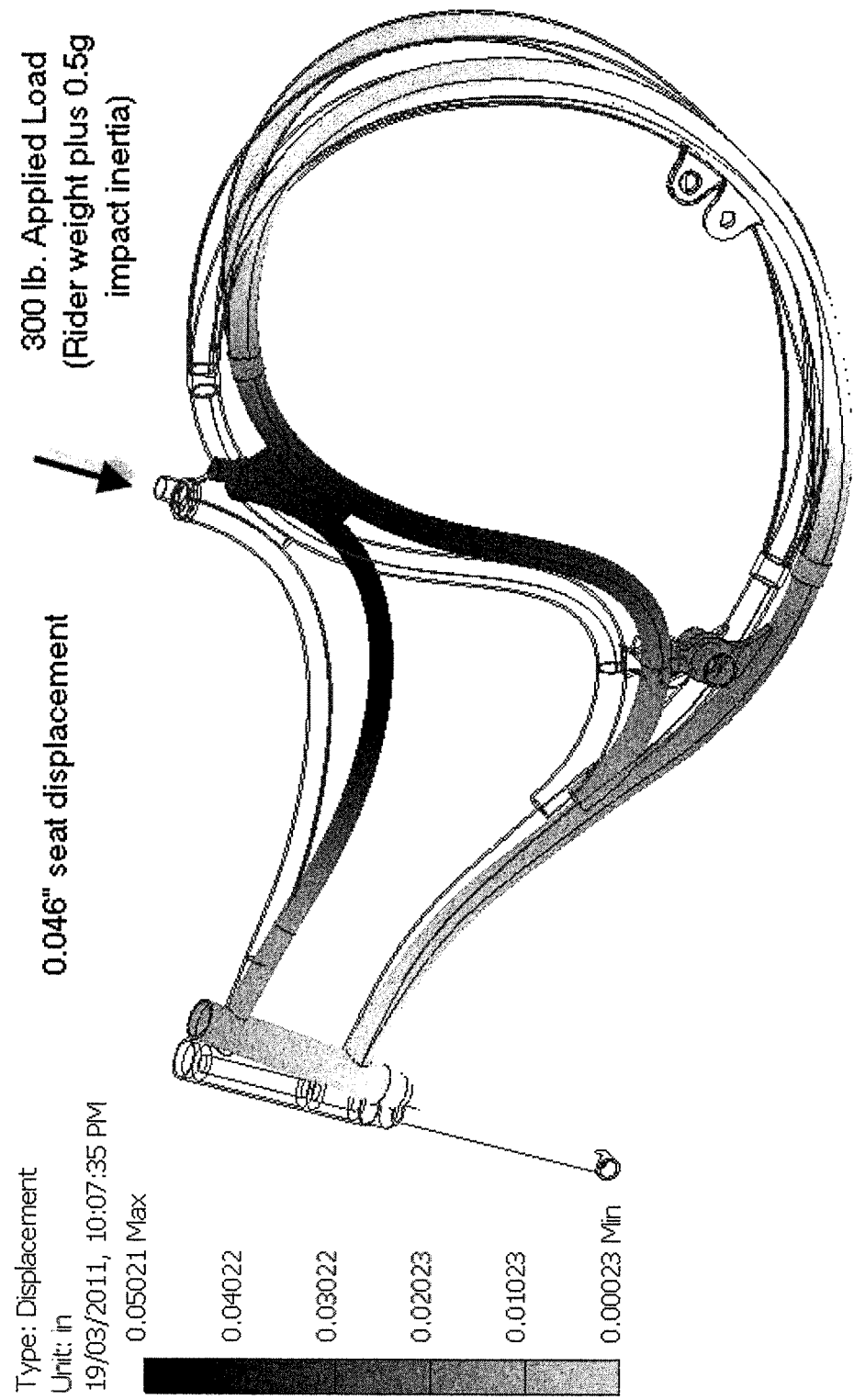
Figure 23:
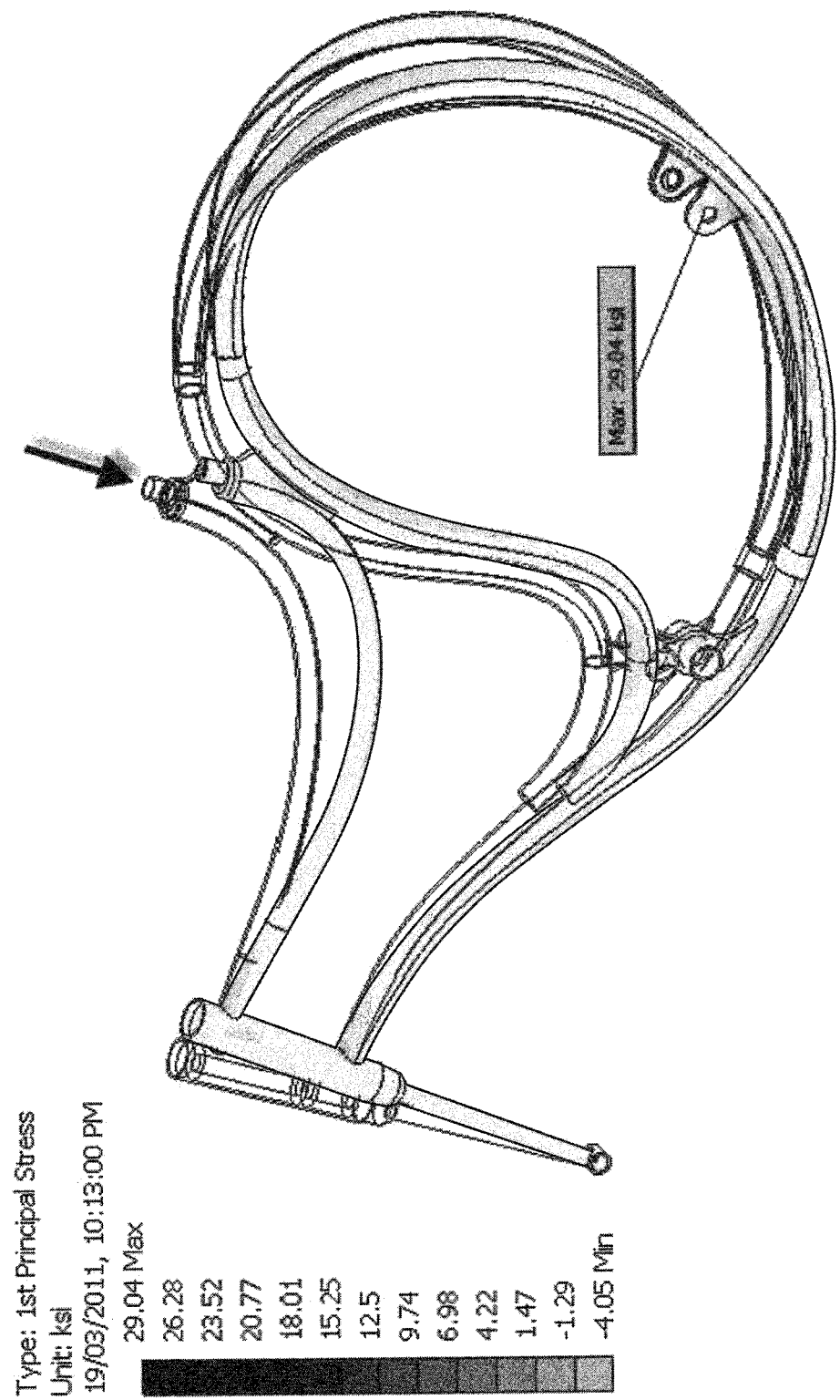
Figure 24:
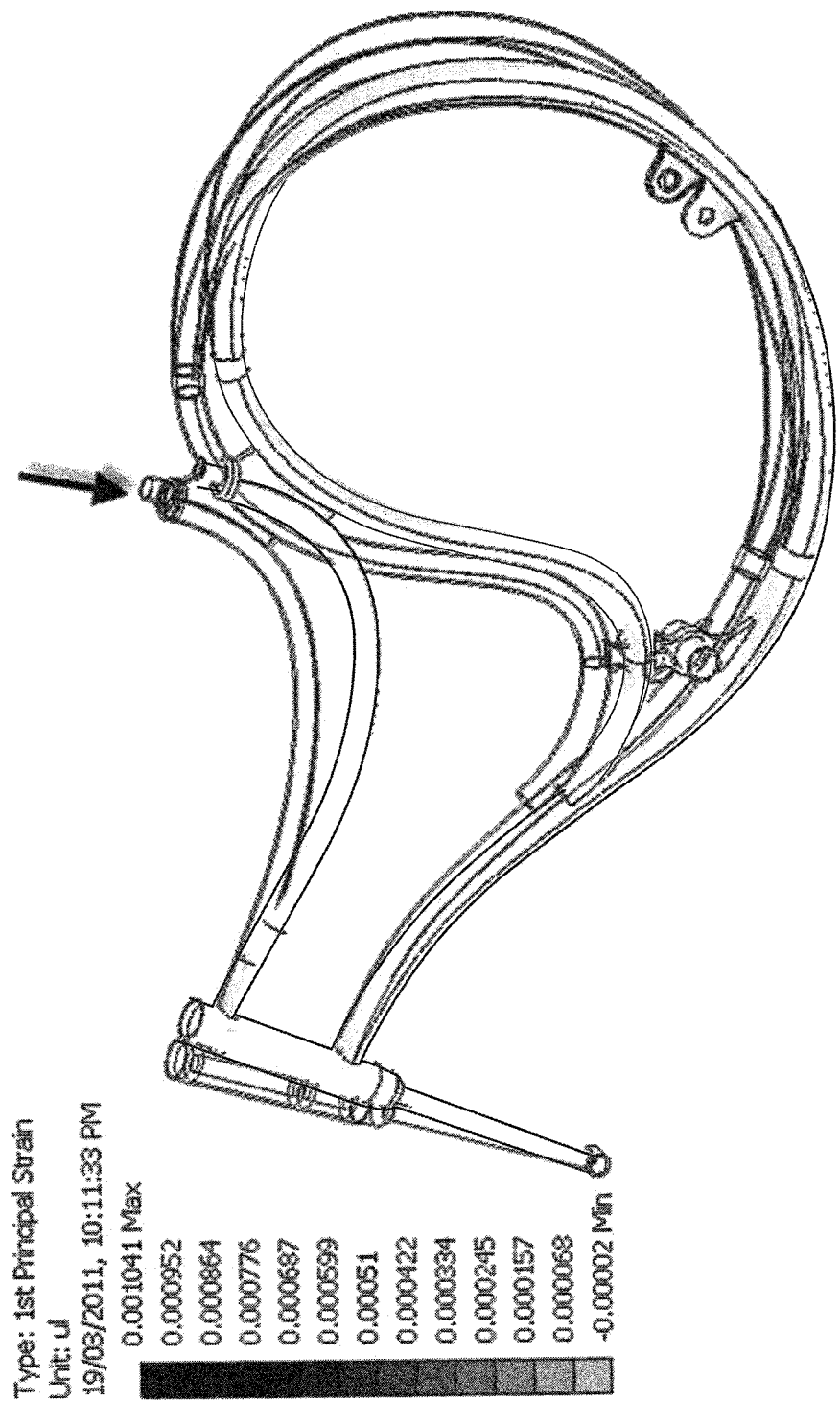
Figure 25:
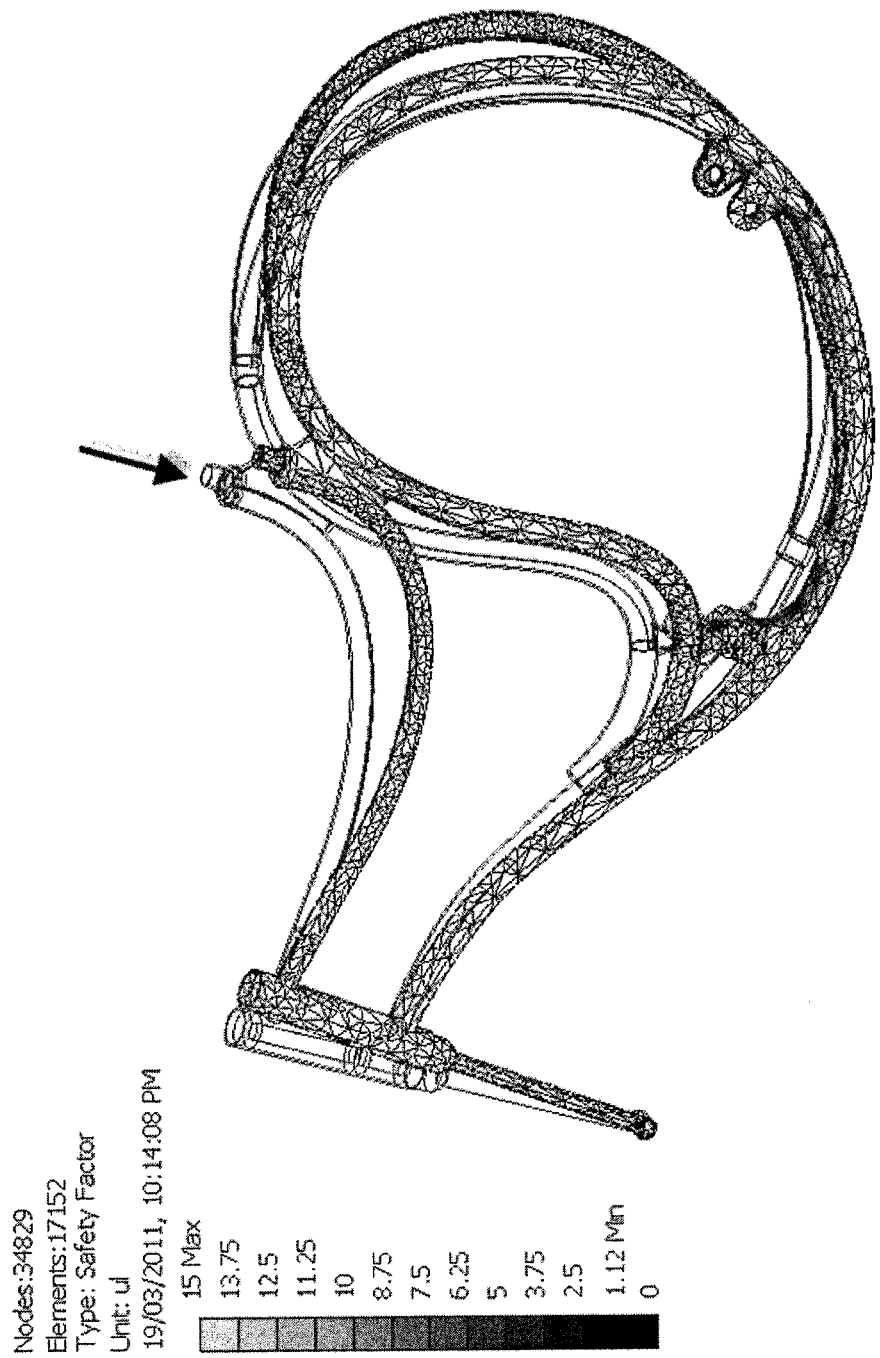
Figure 26:
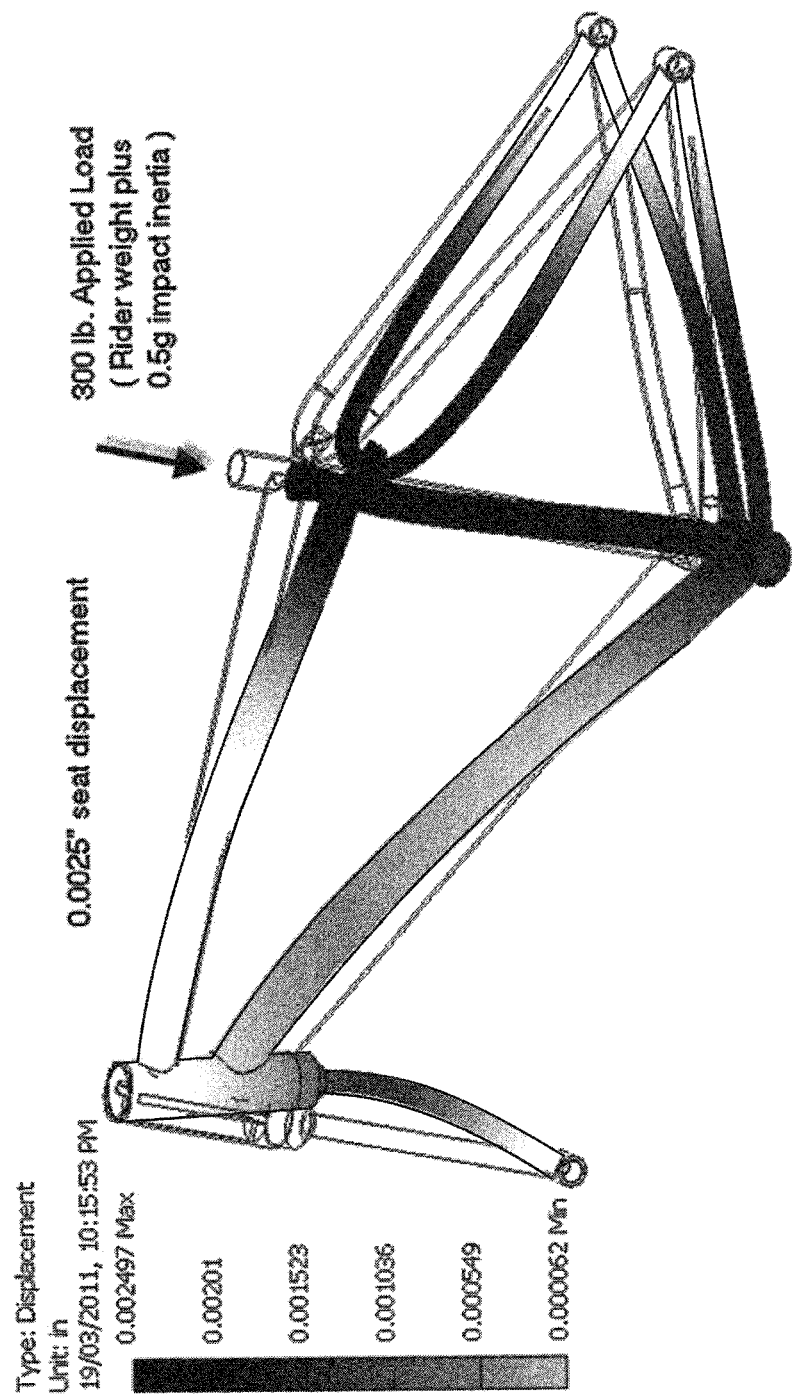
Figure 27:
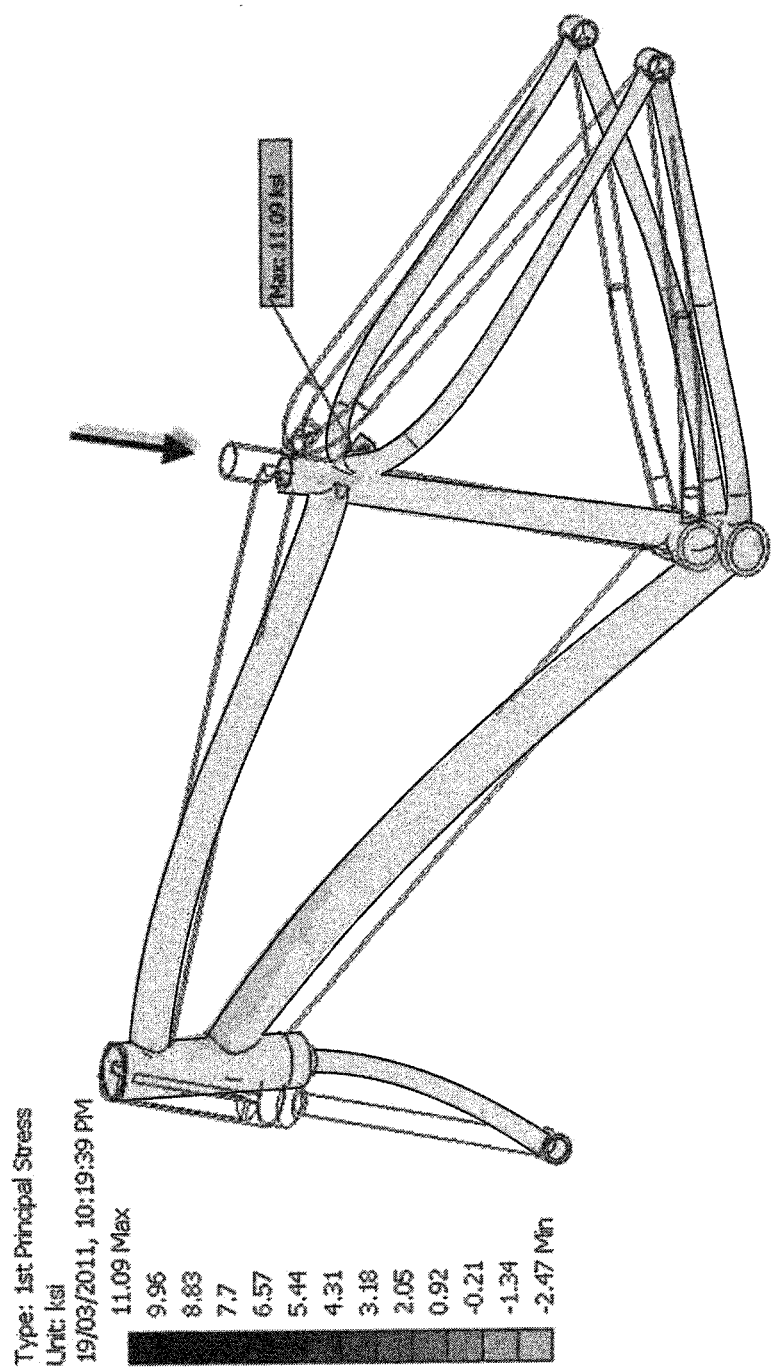
Figure 28:
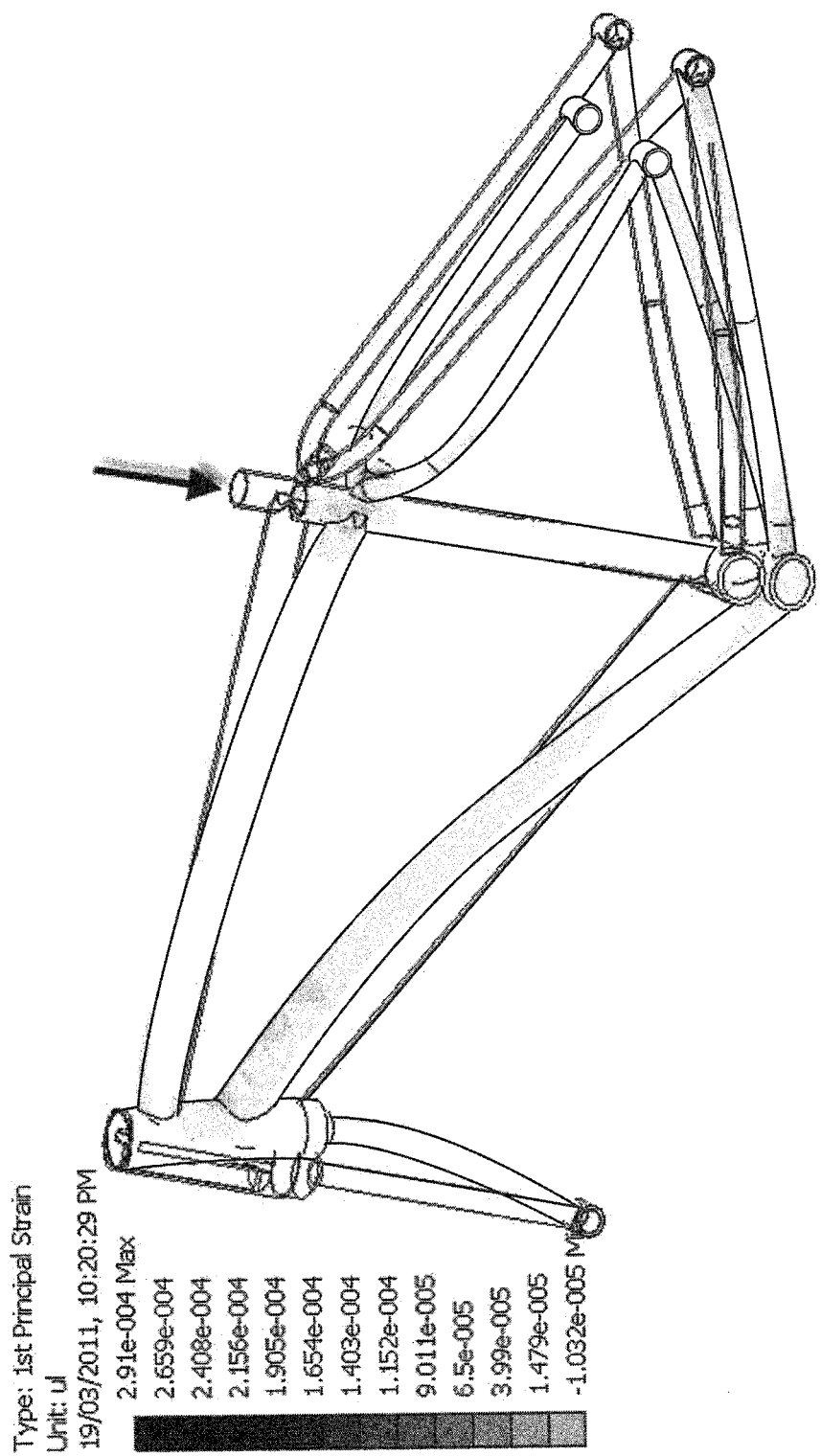
Figure 29:
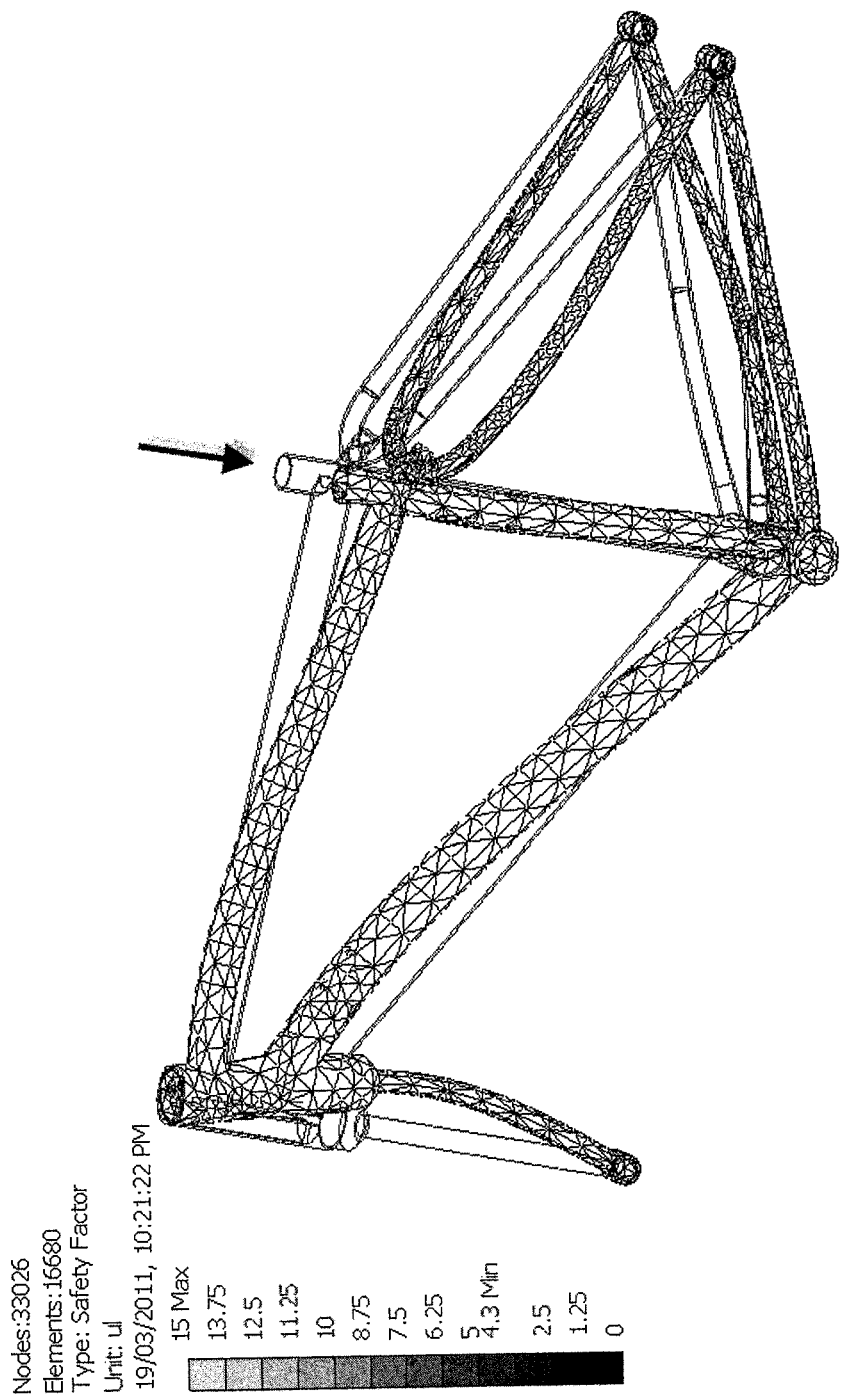
Figure 30:
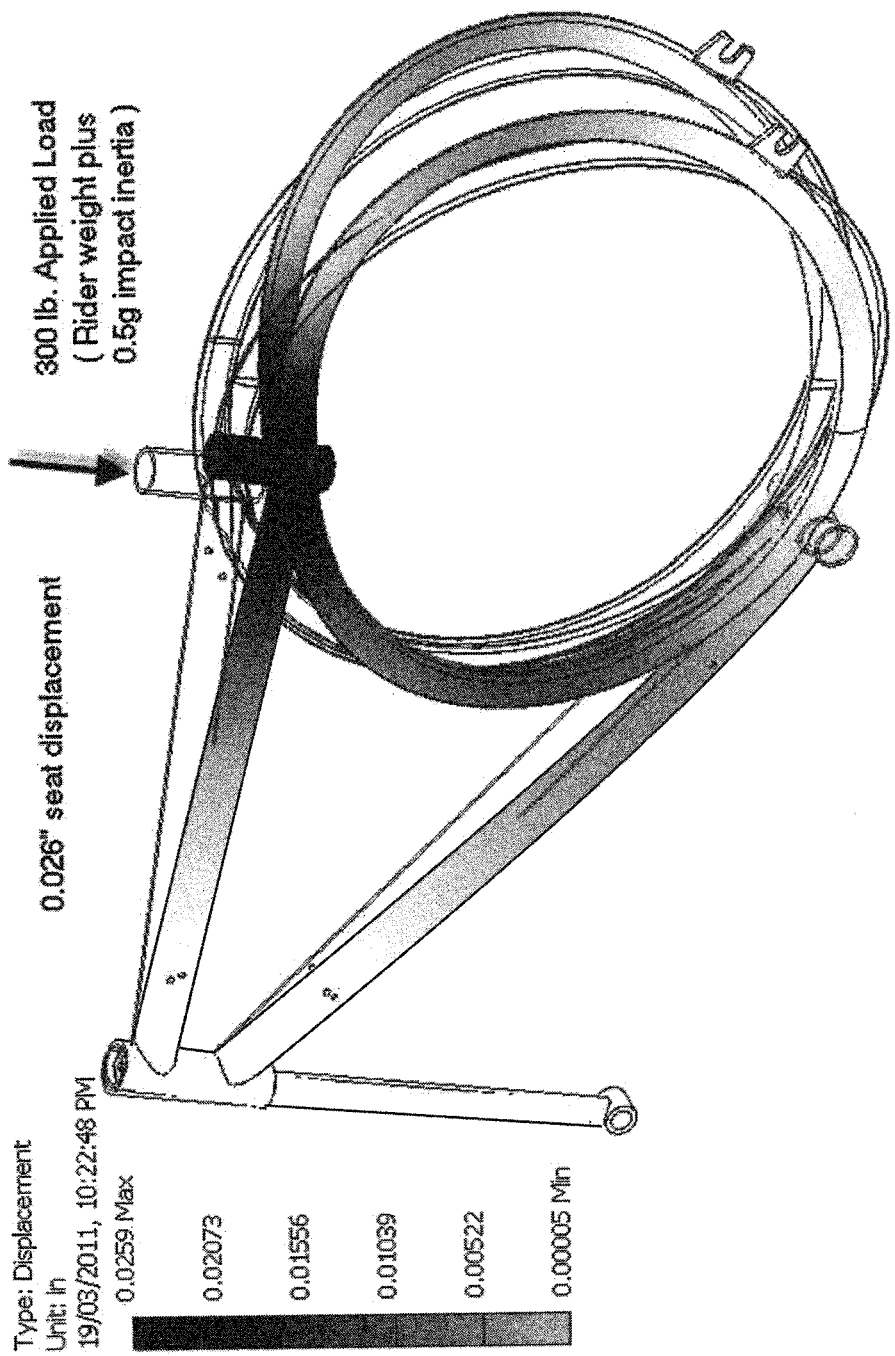
Figure 31:
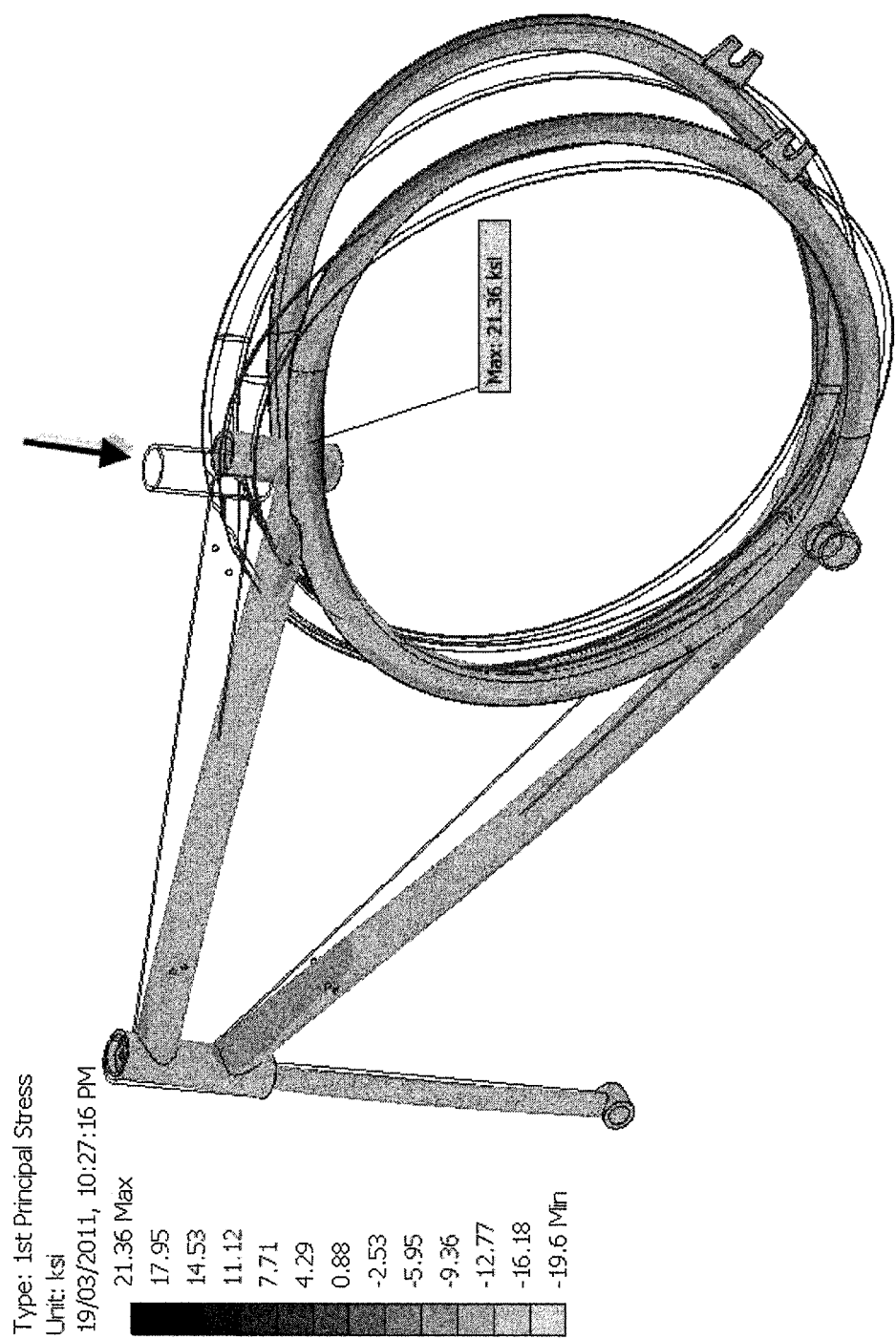

From FIG. 12 it is apparent that the volume of material that contains strain energy is quite concentrated, indicating that this style of frame is not ideally suited for efficiently absorbing energy within the full volume of frame material available.

Busse "Boys" Frame D27186—Boys Style

Attention is next directed to FIGS. 14 to 17 which depict results of FEA modelling of stress testing on the frame disclosed in U.S. Design patent 2716 issued on Jun. 8, 1897 to Busse.

The frame of D27186 comprises a "continuous" formed tube-member that begins at a head post, curves down under a pedal hub to just "aft" of a rear axle, then continues in an upward and forward circular path curving under a seat post, back down to just above the pedal hub, curving rearward and finishing up at a rear axle after having formed a full 360° circle, plus an approximate 90° overlap. The axis of the rear axle falls eccentrically within the perimeter of the formed circle of the frame. In comparison, frames 100, 100a comprises no such continuous tube, and instead incorporates the angular merging of rings 101, and 101aa, 101ba, that replace the rear triangular portion of a common bicycle frame. In contrast, the frame of D27186 is formed from a continuous tube. Also, the rear wheel brackets 107, 107a of frames 100, 100a does not fall "within" rings 101, and 101aa, 101ba as it does in frame of D27186 but are instead, on the outside of rings 101, and 101aa, 101ba to create a push rather than pull effect when transferring load from a rear wheel to rings 101, and 101aa, 101ba. However, it is appreciated that in other implementations brackets 107 can extend inwards rather than outwards.

In any event, from FEA of the model of frame of D27186 it apparent that most of the mechanical strain is concentrated in a few locations, indicating less strain-energy absorption than the dual ring system of frames 100, 100a as will be described below.

Further, uniaxial stress of the frame of D27186 was determined from the FEA results: an averaged principle stress of 5.88 ksi for the entire frame of D27186 corresponded to 31.5 in-lbs of stored strain energy, or roughly half of the strain energy capacity of the frames 100, 100a as can be understood from Table 2 of FIG. 39, as will be described below.

Harris Frame D26590—Single Tube

Attention next first directed to FIGS. 18 to 21 which depict results of FEA modelling of stress testing on the frame disclosed in U.S. Design patent 26590 issued on Feb. 2, 1897 to Harris.

The frame of D26590 generally comprises a continuous formed tube-member that begins at a head post, curves down under a pedal hub to just "aft" of a rear axle, then continues in an upward and forward circular path curving under a seat post, then downward to just above the pedal hub, but then, unlike the frame of D27186, curves "forward" and upward after having formed about three quarters of a circle, merging with itself close to where it began at the head post. The axis of the rear axle falls eccentrically within the perimeter of the formed circle of the frame.

In any event, from FEA of the model of frame of D26590 it apparent that mechanical strain is concentrated in a few locations, indicating less strain-energy absorption than the dual ring system of frames 100, 100a as will be described below.

Further, uniaxial stress of the frame of D26590 was determined from the FEA results: an averaged principle stress of 3.40 ksi for the entire frame corresponded to 10.5 in-lbs of stored strain energy, or roughly one sixth of the strain energy capacity of the frames 100, 100a, as can be understood from Table 2 of FIG. 39, as will be described below.

Harris Frame D26590—Split Tube

Attention next directed to FIGS. 22 to 25 which depict results of FEA modelling of stress testing on the frame disclosed in U.S. Design patent 26590 issued on Feb. 2, 1897 to Harris, however in FIGS. 22 to 25 it is assumed that the frame of D26590 has a split tube. Specifically, D26590 is not clear and in some interpretations could be understood to comprise a split frame at the rear that would straddle both sides of a rear wheel.

Hence, FEA of the frame of D26590 was repeated with the assumption that of a split frame. However, other than some points of high stress concentration, it was found that the two versions of the frame of D26590 reacted in essentially the same manner.

In any event, from FEA of the model of the variant of frame of D26590 it is apparent that most of the mechanical strain is concentrated in a few locations, indicating less strain energy absorption than the dual ring system of the frame 100, 100a, as will be described below.

Further, uniaxial stress of the variant of frame of D26590 was determined from the FEA results: averaged principle stress of 2.18 psi for the entire frame corresponded to 4.35 in-lbs of stored strain energy, or roughly one fourteenth of the strain energy capacity of the frames 100, 100a, as can be understood from Table 2 of FIG. 39, as will be described below.

Diamond Frame

Attention is next directed to FIGS. 25 to 29 which depict results of FEA modelling of stress testing on a "standard" diamond bicycle frame as depicted in FIGS. 25-29. From the FEA test results provided, it is appreciated that the diamond frame was the most rigid and had the lowest deflections of the various frames modeled. Furthermore, the diamond frame was found to possess the lowest strain energy capacity with a strain energy value of 1.14 in-lbs, or roughly 1/60th of the energy absorbed in frames 100, 100a as can be understood from Table 2 of FIG. 39, as will be described below.

Frame 100a

Attention is next directed to FIGS. 30 to 34 which depict results of FEA modelling of stress testing on frame 100a of FIGS. 7a and 7b.

Frame 100a differs from the frames of D27186, D27187 and D26590 (as disclosed and variant) in at least that frame 100a is not constructed from a continuous tube. Rather, frame 100a comprises the angular merging of rings 101aa, 101ba, that replace the rear triangular portion of the diamond frame. Indeed, it is appreciated that frame 100a can also be appreciated to comprise a flattened egg-shape with the more sharply pointed end facing radially outward from the center axis of rings 101aa, 101ba. Also, in some implementations, the rear axle of frame 100a does not fall "within" rings 101aa, 101ba as it does the rear axle the frames of D27186, D27187 and D26590, but can be instead, on the outside of rings 101aa, 101ba to create a push rather than pull effect when transferring the rear axle load to rings 101aa, 101ba.

Figure 34:
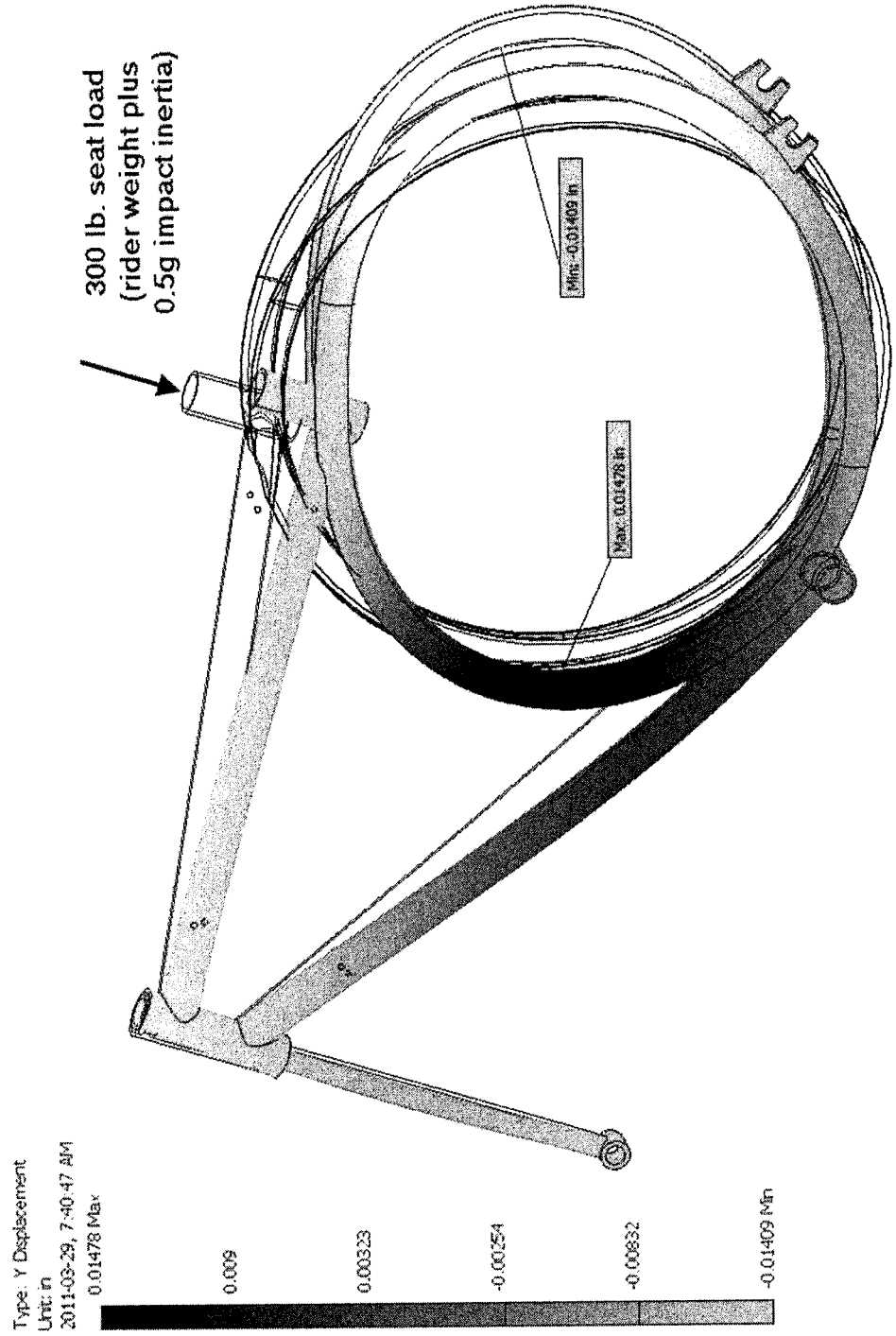
Figure 35:
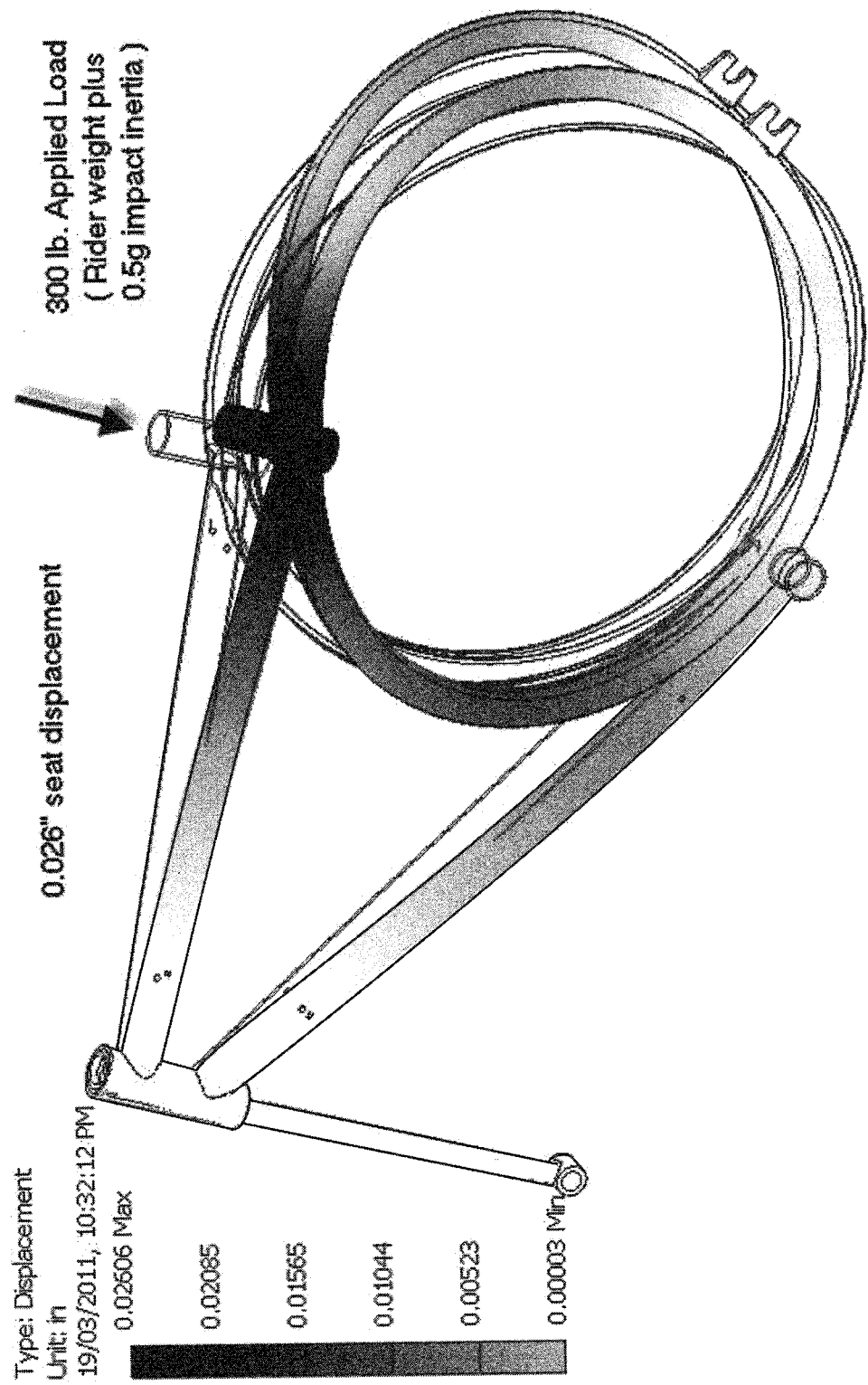
Figure 36:
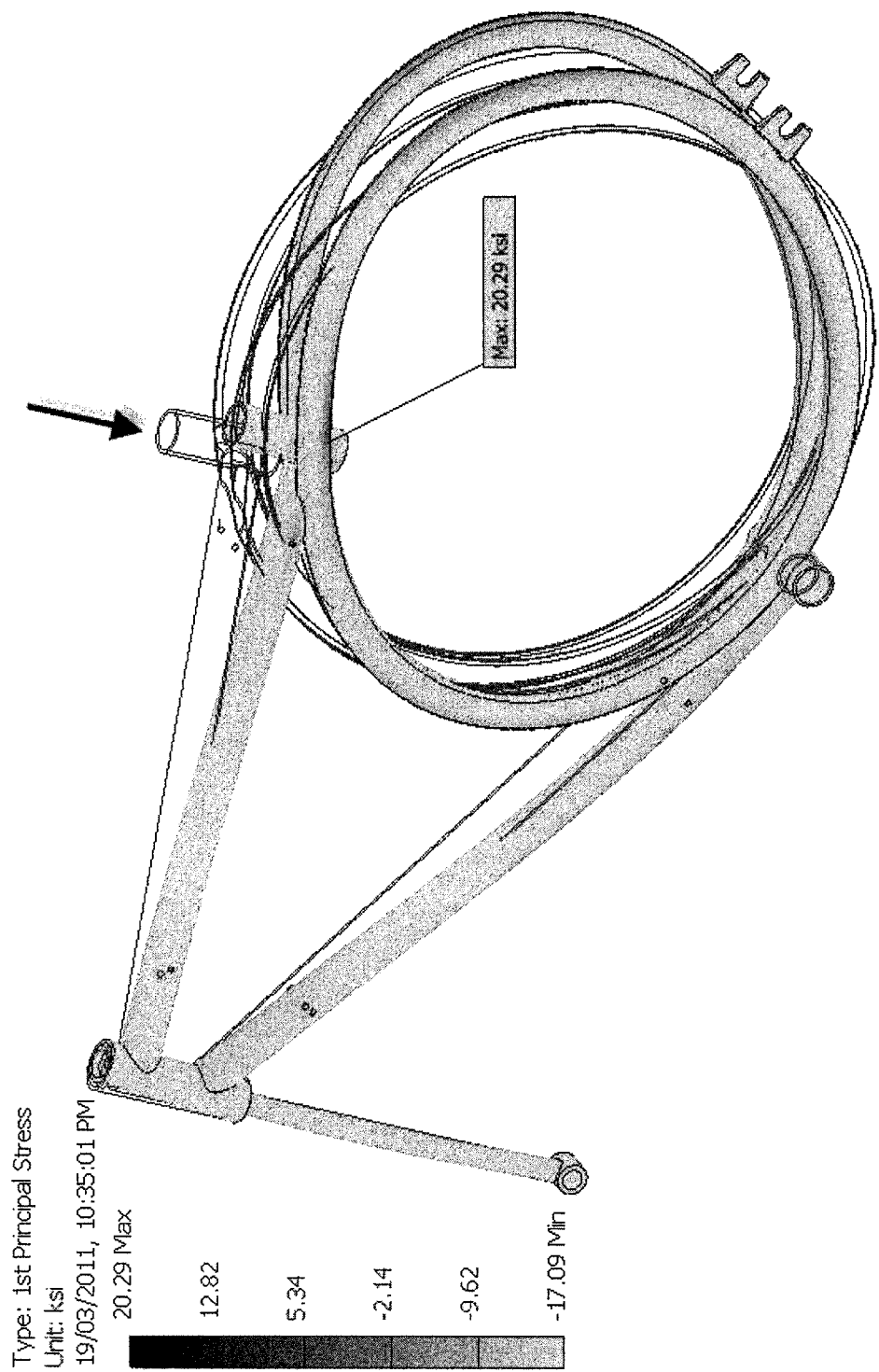
Figure 37:
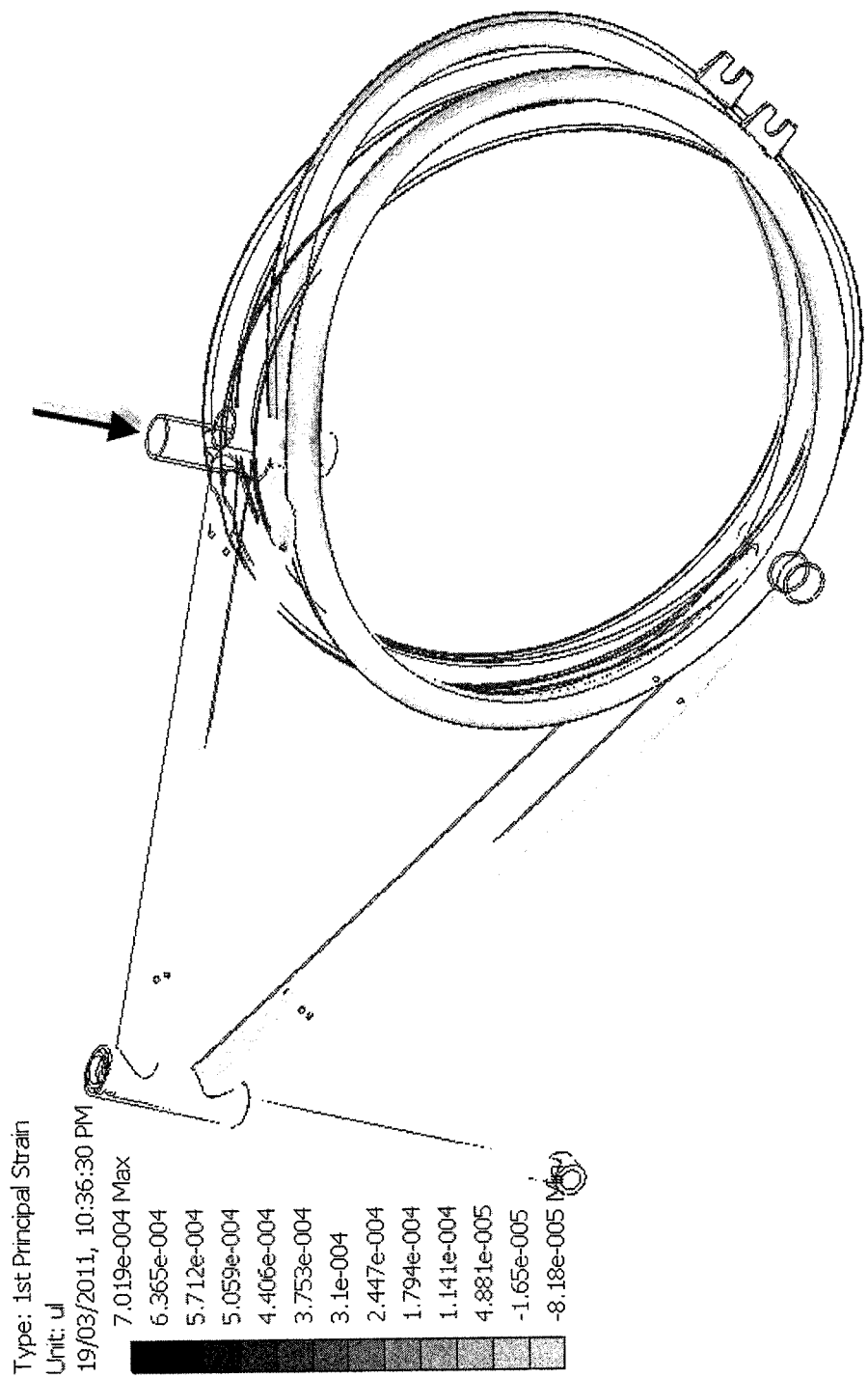
Figure 38:
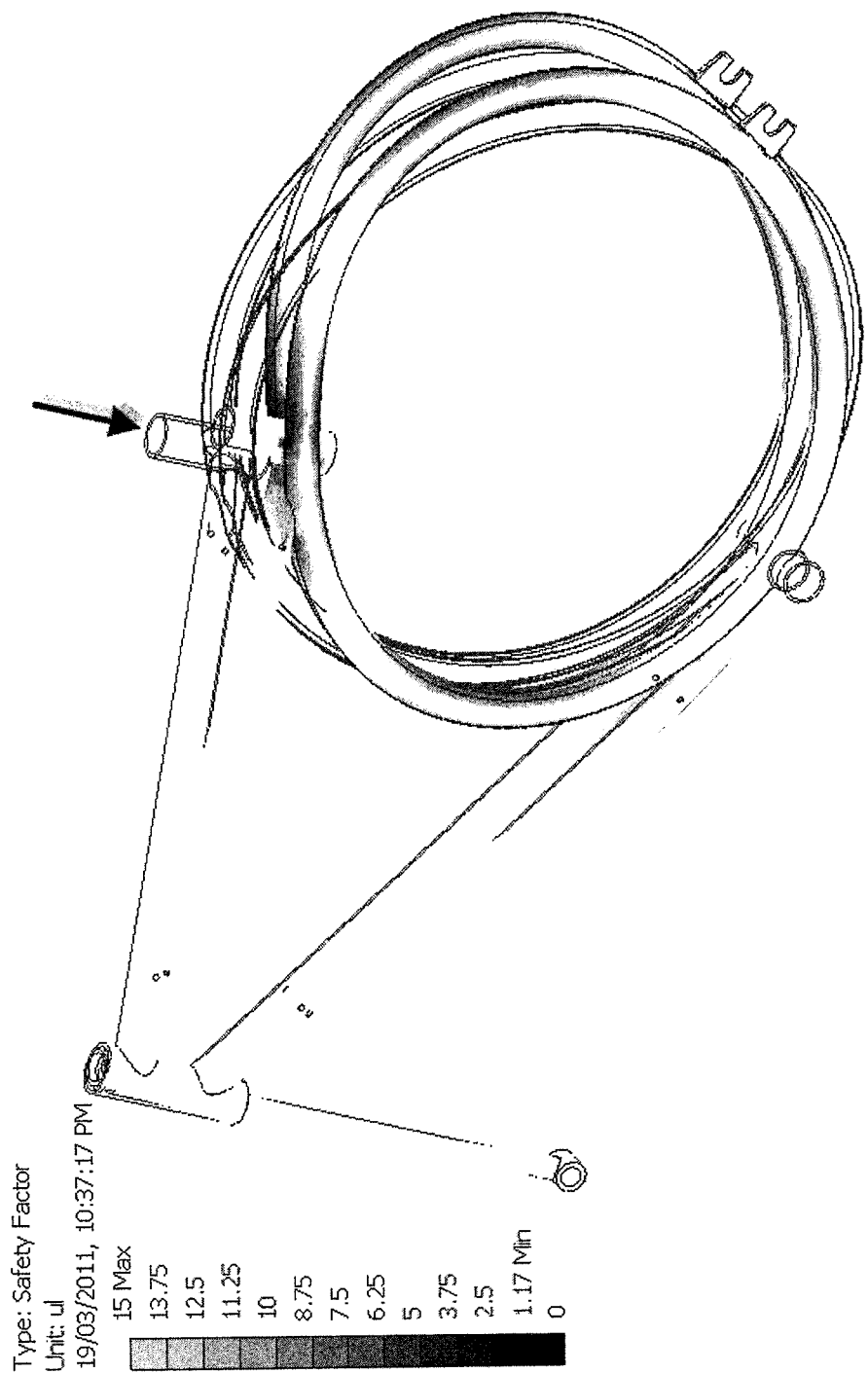

The performance frame 100a was superior to the frames of D27186, D27187 and D26590 from the standpoint of obtaining an optimum balance between strength, flexibility, and energy absorption capacity. For example, as best seen in FIG. 34, rings 101aa, 101ba provide better spring quality properties and a nicely balanced deformation pattern which is symmetrical to the center of the rings with 0.0148" deflection in the fore direction and 0.0141" in aft direction. From the model, seat post 103a is appreciated to be located at a neutral point of the fore/aft displacement of rings 101aa, 101ba indicating that less vibration is transmitted to a rider as rings 101aa, 101ba are providing a spring function.

Figure 32:
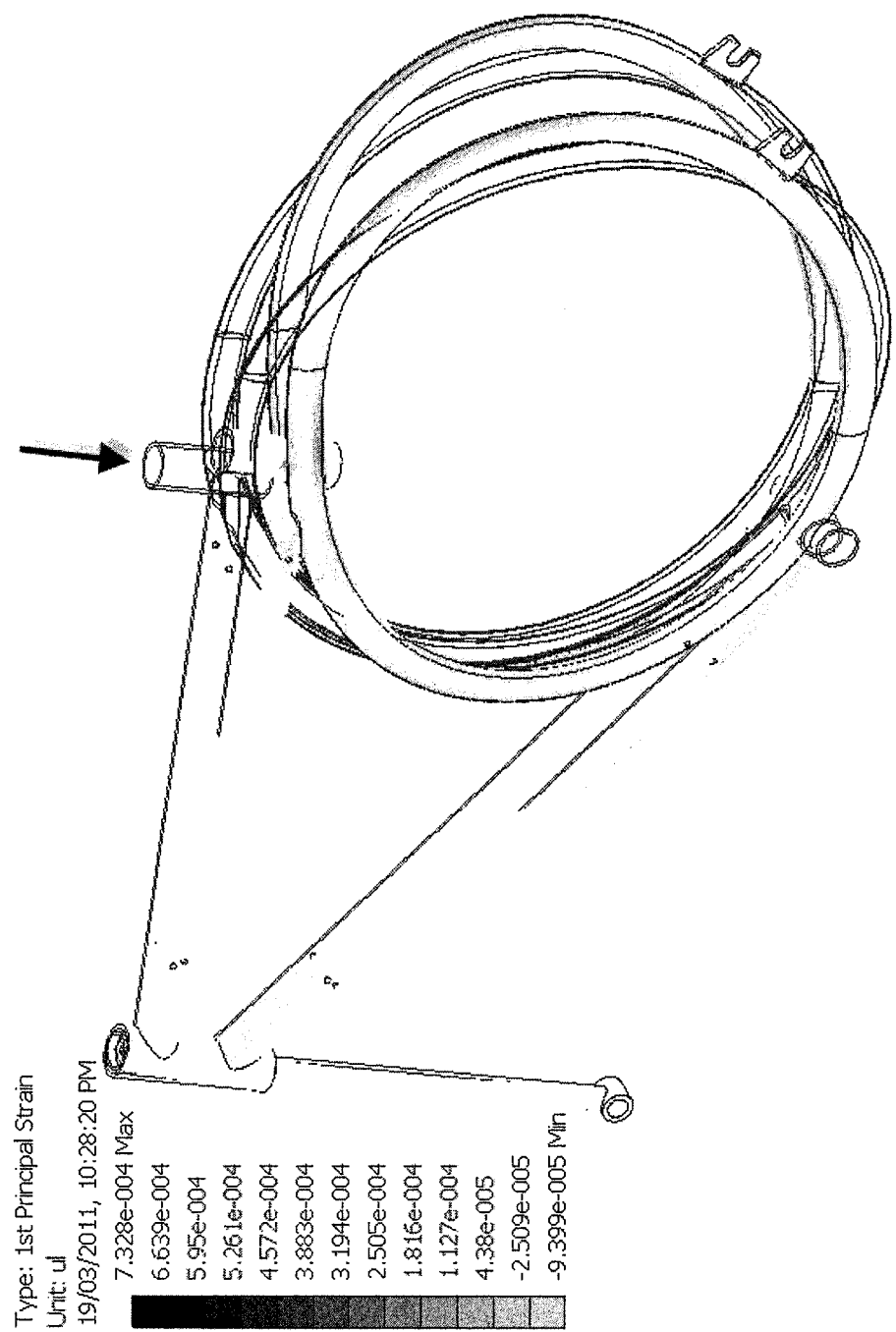
Figure 33:
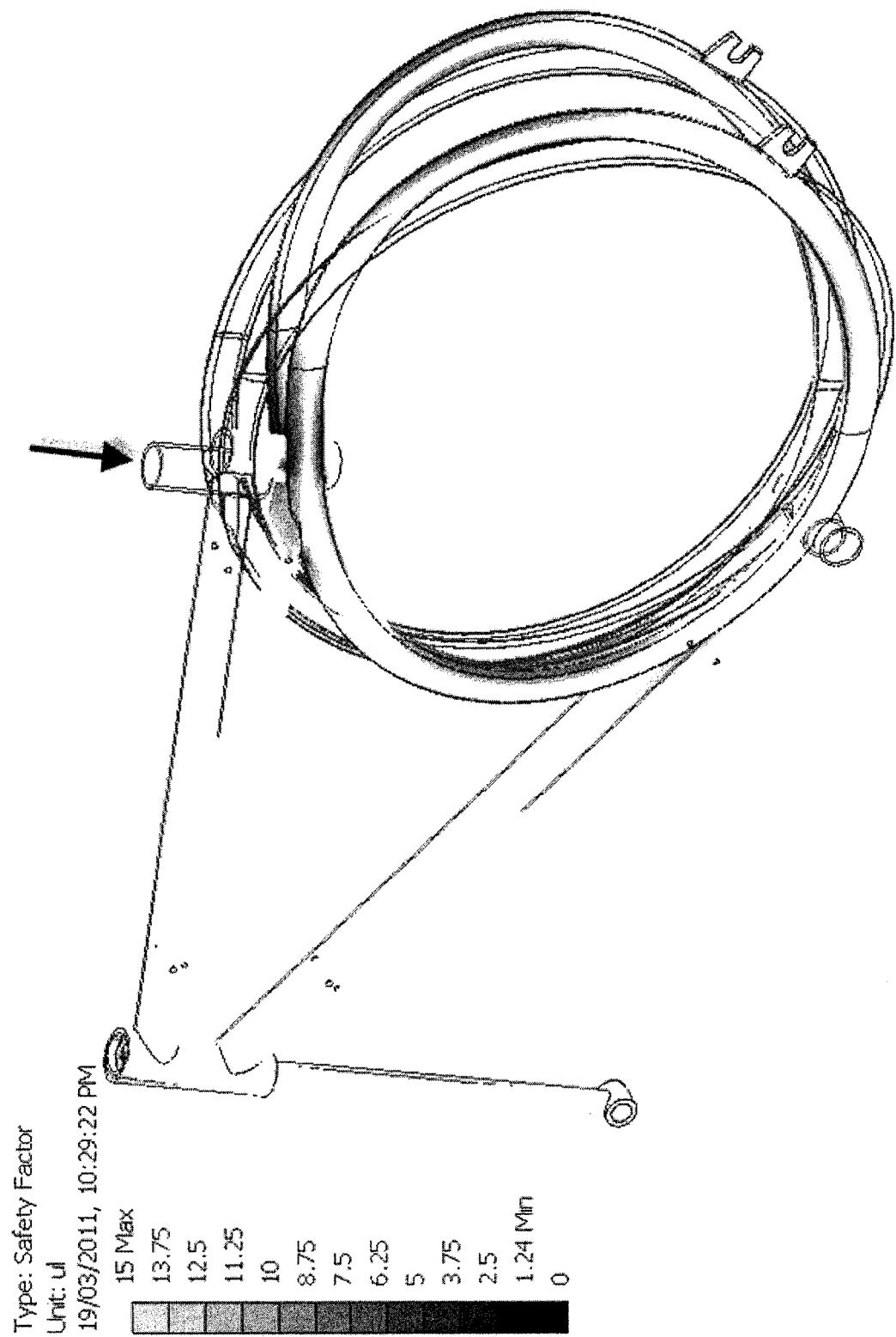

The strain distribution depicted in FIG. 32 is superior to strain distribution of the frames of D27186, D27187 and D26590. It is further appreciated that relative displacement between the bottom bracket 109a and rear wheel brackets 107a is much less than in any of the frames of D27186, D27187 and D26590. Such a low relative displacement maintains rider efficiency over bumpy terrain or road surface due to the minimizing of vibration losses that would be transmitted to a drive chain assembly.

Frame 100

Attention is next directed to FIGS. 35 to 38 which depict results of FEA modelling of stress testing on frame 100a of FIGS. 7a and 7b. A comparison between results of frame 100 and 100a was performed: little difference was found in overall performance between frames 100 and 100a. However, frame 100a provided more strain energy absorbing capacity than frame 100. Frame 100a was also found to possess slightly better lateral strength than frame 100.

Attention is now directed to FIG. 39 which depicts Table 1 and Table 2 which provide a summary of the stress testing of FIGS. 14 to 37. Table 1 comprises displacement (in inches) for each of the frames of D27186, D27187 and D26590 (single and split tube), the diamond frame, and frames 100, 100a. Table 2 comprises the principle stress, principle strain, safety factor, average stress and derived strain energy for each of the frames of D27186, D27187 and D26590 (single and split tube), the diamond frame, and frames 100, 100a. The approximate aver age stress was derived from $1^{st}$ principle strain FEA results, and by approximating a percentage of each frame under principle strain. A maximum principle stress value was divided by two to obtain an approximate average for the strained percentage of material volume. An intermediate stress value was multiplied by the percentage of the frame being strained to obtain an average principle stress for the entire frame. Once the approximate average principle stress was obtained, a basic unit strain-energy was applied and multiplied by the cubic-inch volume of each respective frame to obtain a total amount of stored strain energy in inch-pounds for the frame.

In any event, from Table 2, it is appreciated that frames 100 and 100a have better strain energy than any of the other frames, with values of 59.6 in-lbs and 67 in-lbs respectively, which are each approximately 60-70× that of the diamond frame, 14-15× that of the frame of D26590 (split tube), 6-7× that of the frame if D26590 (single tube), 2× that of the frame of D27186, and 20× that of the frame of D27187. Hence, at a minimum, each of frames 100,100a provide at least a 100% improvement in dissipating strain energy over the prior art.

It is also appreciated from the FEA testing that as rings 101, and 101aa, 101ab are monolithic (i.e. do not form a continuous structure with a top tube and/or a downtube), stress energy is less likely to be transferred to other parts of frame 100, 100a Hence, by providing a bicycle frame which comprises two substantially concentric rings are connected along a front portion and flared out at a rear portion to enable a rear bicycle wheel to fit there between, the rings replacing at leas the seat tube, the chain stays and the seat stays, better strain energy distribution is achieved over the prior art, resulting in a more resilient frame and a smoother ride when the present bicycle frames are incorporated into a bicycle.

Indeed, it is appreciated that introducing the two monolithic rings on the rear of a bicycle frame, as described herein, further provides a new shape to existing bicycle frames, as well as introducing an improvement that reduced the impact energy and constant vibrations that are delivered by conventional frames to a rider's spine. It is further appreciated that the continuous rings provided herein for absorbing the impact of weight of the rider does not compromise performance or lateral stiffness of the frame and further absorbs road vibrations. On a conventional diamond geometry the rider is in direct contact to each of the smallest imperfections and bumps of the road surface that through a straight path from the seatpost and seat-stay is transferred from the road directly to the riders spine. It is further appreciated that the additional absorption of impact and strain-energy by the rings provided herein can be especially beneficial for long distance riding, "iron-man" competitions, triathlons, cross cycling, elevation changing stage racing, mountain biking, city distance riding and working cyclists etc. Furthermore, a frame with the rings provided herein can enable riders who periodically are not able to ride due to the physical stress that is felt on a standard diamond bicycles, for example aging riders experiencing health issues. In other words, a bicycle frame with the rings provided herein provides a rider, who experiences discomfort from the extended riding of a vertically-stiff frame, with an alternative frame that improves the riders comfort while riding and extend his or her participation in leading an active lifestyle that promotes physical well being.

It is furthermore appreciated that in presently provided bicycle frames, the standard seat-stay, chain-stay, and seat-tube of the "diamond shaped" bicycle geometry are removed. Rather, these features are replaced by two rings that come together toward the front of the bicycle frame and open up in the rear of the bicycle frame to accommodate the placement of a rear wheel between them, as well as gears etc. Hence, the standard rear triangle is replaced herein with a circle and/or ellipse.

It yet further appreciated the placement of the bottom bracket shell (e.g. bottom bracket 109), the placement of the rear forks (e.g. rear wheel brackets 107), and the position of the seat post are not affected by the rings when compared to the geometry of a standard diamond: in other words, these features are generally located in positions that are similar to their corresponding positions in a standard diamond bicycle frame.

However, in comparison with the diamond frame, the path of impact from the bottom bracket shell and rear forks is no longer a direct connection from the full load of the impact directly to the spine of the rider. Rather, the ring shape enables the path of the impact to follow the rings and curve upward to the seat post. Hence, together the rings act as spring, store energy and flex under impacts and loads that do not make it to the rider's spine with the same magnitude as the standard frame.

It is yet further appreciated that the present implementations comprise two continuous rings that come together in the front where the merging of the two rings develops an anchor point for the rings to act as one unit independent of the remainder of the frame. Hence, the rings do disrupt the stability of the remainder of the frame, and in particular the bottom bracket shell and head tube. Hence, the bottom bracket shell and/or headtube are not substantially displaced and/or modulated under the stress absorption of the rings; neither do the bottom bracket shell and/or headtube substantially flex under under a riders load and/or returned impact loads.

Present implementations further provide improved aerodynamic performance of bicycle frames by eliminating the vertical and direct surface area of the sometimes bulky downtube and vertical seatstay. Rather, front portion of the rings which replace the seat tube are joined for a short distance then open up allowing air to flow between the rings. In addition, the round/curved shape of the rings in the front and rear result in no direct vertical surface on the rear of the bike being pushed against on coming wind drag. Such a reduction in drag can have a substantial effect on racing times over extended periods of time.

It is further appreciated that in some implementations the tubing used to form the rings is hollow and such hollow tubing can be formed form light weight materials including but not limited to aluminum, low carbon high strength thin-walled steel, titanium, carbon finer or any other suitable material. It is further appreciated that hollow tubing that can be commonly used in standard frame construction as present implementations, can provide a conduit for running concealed cabling that controls the power train and braking system of a bicycle. However, the rings lend themselves to improved routing of control cables through the interior of the tubing due to the curved and/or rounded shape.

In some implementations, the rings provide an option to conceal a rear brake directly between the rings, as compared to standard surface mounting of the rear brake on the seat-stay surface common to diamond geometries. This greatly improve the sleekness and appearance of the bicycle frame It is appreciated that the cycling industry depends greatly on corporate sponsors who provide the funding for team competitions and amateur and professional racing. The rings provide a distinctive surface area on the rear RINGS that was previously not available on diamond geometries. This added distinctiveness will give a competitor who is riding a bicycle incorporating present implementations of the bicycle frame (as apposed to a diamond geometry) a more attractive vehicle for a sponsor to affix his corporate message and logo.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A bicycle frame comprising:
two substantially concentric rings connected along a front portion and flared out at a rear portion to enable a rear bicycle wheel to fit there between, said two substantially concentric rings enabled to absorb strain energy received from at least one of the rear wheel and weight from a rider;
a seat post for receiving a bicycle seat, said seat post extending from a top portion of said two substantially concentric rings, and wherein said seat post extends from a gap between said two substantially concentric rings, said seat post connected to each of said two substantially concentric rings in said gap;
a rear wheel bracket extending from a bottom rear portion of each of said two substantially concentric rings for supporting the rear wheel between said two substantially concentric rings;
a bottom bracket located proximal a bottom front portion of said two substantially concentric rings, said bottom bracket for connecting at least a crank to the bicycle frame;
a headtube for receiving a front fork; and,
at least one support for said headtube to connect said headtube to said two substantially concentric rings, wherein said at least one support for said headtube comprises:
a top tube extending from said gap to said headtube, said top tube connected to at least one of aid seat post and each of said two substantially concentric rings in said gap; and
a down tube extending from said headtube to said bottom front portion of said two substantially concentric rings, proximal said bottom bracket.

2. The bicycle frame of claim 1, wherein each of aid two substantially concentric rings comprise at least one of a circle and an annulus.

3. The bicycle frame of claim 1, wherein said at least one support structure comprises at least one of:
a top tube extending from said headtube to said top portion of said two substantially concentric rings or a top front portion of said two substantially concentric rings;
a second tube extending from said headtube to said top front portion of said two substantially concentric rings;
a third tube extending from said headtube to said seat post;
a down tube extending from said headtube to said bottom front portion of said two substantially concentric rings, proximal said bottom bracket.

4. The bicycle frame of claim 1, wherein each of said two substantially concentric rings comprise an ellipse.

5. The bicycle frame of claim 4, wherein said ellipse extends from the rear wheel brackets to said headtube, said at least one support structure comprises at least a weld to said ellipse.

6. The bicycle frame of claim 1, wherein said two substantially concentric rings are further flared out at said rear portion via a bend in said two substantially concentric rings providing further space for the rear wheel to fit there between.

7. The bicycle frame of claim 1, wherein said downtube is connected to at least one of said bottom front portion and said bottom bracket.

8. The bicycle frame of claim 1, wherein said two substantially concentric rings, said seat post, said rear wheel bracket, said bottom bracket, said headtube and said at least one support for said headtube comprise an integral structure.

9. The bicycle frame of claim 1, wherein said two substantially concentric rings are monolithically independent of said seat post, said rear wheel bracket, said bottom bracket, said headtube and said one support for said headtube, such that said strain energy is substantially absorbed by said two substantially concentric rings thereby preventing said strain energy from being substantially translated to a remaining portion of the bicycle frame.

10. The bicycle frame of claim 1, further comprising at least one of metal, metal alloys, aluminum, aluminum alloys, steel, high carbon steel, chromoly steel, titanium, carbon fibre, and bamboo.

* * * * *